(12) United States Patent
Damnjanovic et al.

(10) Patent No.: US 11,147,100 B2
(45) Date of Patent: Oct. 12, 2021

(54) FLEXIBLE SYNCHRONOUS AND ASYNCHRONOUS ACCESS PROCEDURE

(71) Applicant: QUALCOMM Incorporated, San Diego, CA (US)

(72) Inventors: Aleksandar Damnjanovic, Del Mar, CA (US); Yisheng Xue, San Diego, CA (US); Lorenzo Ferrari, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 133 days.

(21) Appl. No.: 16/537,343

(22) Filed: Aug. 9, 2019

(65) Prior Publication Data
US 2020/0059963 A1 Feb. 20, 2020

Related U.S. Application Data

(60) Provisional application No. 62/718,657, filed on Aug. 14, 2018.

(51) Int. Cl.
*H04W 28/26* (2009.01)
*H04W 74/08* (2009.01)
*H04W 56/00* (2009.01)

(52) U.S. Cl.
CPC ....... *H04W 74/0808* (2013.01); *H04W 28/26* (2013.01); *H04W 56/001* (2013.01)

(58) Field of Classification Search
CPC ....................................................... H04L 12/28
USPC .......................................................... 370/329
See application file for complete search history.

(56) References Cited

U.S. PATENT DOCUMENTS

2016/0309354 A1   10/2016  Yerramalli et al.
2020/0059963 A1*   2/2020  Damnjanovic ..... H04W 56/001

OTHER PUBLICATIONS

International Search Report and Written Opinion—PCT/US2019/046135—ISA/EPO—dated Dec. 17, 2019.

(Continued)

*Primary Examiner* — Dang T Ton
(74) *Attorney, Agent, or Firm* — Liem T. Do

(57) ABSTRACT

Methods, systems, and devices for wireless communications are described. A first wireless device may perform a clear channel assessment on a medium to determine if the medium is available for communications with a second wireless device. Based on a successful clear channel assessment, the first wireless device may transmit a medium reservation message to the second wireless device. The second wireless device may then transmit a reservation response message to the first wireless device, where the reservation response message includes synchronization information for the first device to synchronize with the second wireless device. The synchronization information may include a duration of a channel occupancy time, a duration of a synchronous contention window, and/or a duration in which the first wireless device is to maintain synchronization with the second wireless device. Accordingly, the first wireless device and the second wireless device may communicate based on the synchronization information via the medium.

30 Claims, 23 Drawing Sheets

(56) References Cited

OTHER PUBLICATIONS

"IEEE Standard for Information Technology—Telecommunications and Information Exchange Between Systems Local and Metropolitan Area Networks—Specific Requirements—Part 11: Wireless LAN Medium Access Control (MAC) and Physical Layer (PHY) Specifications; IEEE Std 802.11-2016 (Revision of IEEE Std 802", IEEE Standard, IEEE, Piscataway, NJ, USA, Dec. 14, 2016 (Dec. 14, 2016), pp. 1-3534, XP068113034, [retrieved on Dec. 19, 2016], paragraph [10.3.2.4]; figures 10-5 paragraph [9.3.1.2]—paragraph [9.3.1.3].
Partial International Search Report —PCT/US2019/046135 —ISA/EPO—dated Oct. 25, 2019.

\* cited by examiner

FLEXIBLE SYNCHRONOUS AND ASYNCHRONOUS ACCESS PROCEDURE

CROSS REFERENCE

The present application for patent claims the benefit of U.S. Provisional Patent Application No. 62/718,657 by Damnjanovic et al., entitled "FLEXIBLE SYNCHRONOUS AND ASYNCHRONOUS ACCESS PROCEDURE," filed Aug. 14, 2018, assigned to the assignee hereof, and expressly incorporated herein.

FIELD OF INVENTION

The following relates generally to wireless communications, and more specifically to a flexible synchronous and asynchronous access procedure.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-orthogonal frequency division multiplexing (DFT-S-OFDM). A wireless multiple-access communications system may include a number of base stations or network access nodes (e.g., access points (APs)), each simultaneously supporting communication for multiple communication devices, which may be otherwise known as user equipment (UE) or stations (STAs).

Some wireless communications systems may utilize contention-based access procedures when one or more wireless devices attempt to access a medium (e.g., shared radio frequency band). For example, prior to exchanging data, wireless devices in the system may perform a clear channel assessment to determine if the medium is available. If available, the first wireless device may exchange signaling with a second wireless device and thereafter the first wireless device may communicate with the second wireless device on the medium. In some cases, the first wireless device may perform the clear channel assessment on an on-demand basis when data is identified for communication with the second wireless device. However, performing clear channel assessments according to an on-demand basis may limit access to the medium and provide a lower quality of service (QoS) to wireless devices in the system. Efficient techniques are desired for performing contention-based access procedures.

SUMMARY

The described techniques relate to improved methods, systems, devices, and apparatuses that support flexible synchronous and asynchronous access procedure. Generally, the described techniques provide for communicating synchronization information within medium reservation signaling for synchronizing contention windows in which multiple wireless devices may contend for access to a shared radio frequency band. In an example, a first wireless device may perform a clear channel assessment (e.g., perform energy detection, a listen-before-talk procedure, or the like) on a shared radio frequency band to determine whether the shared radio frequency band is available. For example, the first wireless device may sense where a different wireless device is currently transmitting via the shared radio frequency band.

If a result of the clear channel assessment is that the shared radio frequency band is determined to be available, the first wireless device may transmit a medium reservation message (e.g., a request to send (RTS) message) to a second wireless device. The second wireless device may receive the medium reservation message and reply by transmitting a reservation response message (e.g., a clear to send (CTS) message) to the first wireless device. The reservation response message may include synchronization information for the first device to synchronize with the second wireless device. For example, the synchronization information may indicate a beginning and a duration of a synchronous contention window in which a wireless device may contend for access to the medium.

In some examples, the synchronization information may include a duration of a channel occupancy time, a duration of a synchronous contention window, a duration in which the first wireless device is to maintain synchronization with the second wireless device, or any combination thereof. Additionally, the synchronization information may include a time shift to indicate a boundary of the channel occupancy time for scenarios where the entire channel occupancy time is not utilized and a bit indicating that the second wireless device is operating synchronously. Accordingly, the first wireless device and the second wireless device may communicate based on the synchronization information via the shared radio frequency band (e.g., within the indicated channel occupancy time) to limit interference and enhance communication via the shared radio frequency band. In further examples, age information may be associated with the synchronization information. For example, the age information may indicate an elapsed time since the synchronization information was generated. If a wireless device determines that the age information satisfies a threshold (e.g., is less than a threshold value), then the wireless device may transition from asynchronous operations to synchronous operations. Otherwise, the wireless device may determine not to transition to synchronous operations.

In some examples, an asynchronous node (e.g., an access point (AP)) may receive the synchronization information from one or more other nodes (e.g., stations (STAs) or base stations) that it may or might not serve. As described herein, the synchronization information may include information about a synchronous contention window for contending for the shared radio frequency band. Initially, the asynchronous node may perform an asynchronous clear channel assessment on the shared radio frequency band. In some cases, the asynchronous node may then receive a medium reservation message with the synchronization information. Accordingly, the asynchronous node may then perform a second clear channel assessment within the synchronous contention window indicated by the synchronization information. If the shared radio frequency band is determined to be available based on the second clear channel assessment, the asynchronous node may synchronously communicate with another wireless device in accordance with the synchronization information.

A method of wireless communication at a first wireless device is described. The method may include performing an asynchronous clear channel assessment to obtain access to a shared radio frequency band, receiving, via the shared radio frequency band, a medium reservation message from a second wireless device indicating synchronization information for a synchronous contention window, performing a second clear channel assessment within the synchronous contention window to obtain access to the shared frequency band, and communicating, via the shared radio frequency band, data in accordance with the synchronization information based on the second clear channel assessment.

An apparatus for wireless communication at a first wireless device is described. The apparatus may include a processor, memory in electronic communication with the processor, and instructions stored in the memory. The instructions may be executable by the processor to cause the apparatus to perform an asynchronous clear channel assessment to obtain access to a shared radio frequency band, receive, via the shared radio frequency band, a medium reservation message from a second wireless device indicating synchronization information for a synchronous contention window, perform a second clear channel assessment within the synchronous contention window to obtain access to the shared radio frequency band, and communicate, via the shared radio frequency band, data in accordance with the synchronization information based on the second clear channel assessment.

Another apparatus for wireless communication at a first wireless device is described. The apparatus may include means for performing an asynchronous clear channel assessment to obtain access to a shared radio frequency band, receiving, via the shared radio frequency band, a medium reservation message from a second wireless device indicating synchronization information for a synchronous contention window, performing a second clear channel assessment within the synchronous contention window to obtain access to the shared radio frequency band, and communicating, via the shared radio frequency band, data in accordance with the synchronization information based on the second clear channel assessment.

A non-transitory computer-readable medium storing code for wireless communication at a first wireless device is described. The code may include instructions executable by a processor to perform an asynchronous clear channel assessment to obtain access to a shared radio frequency band, receive, via the shared radio frequency band, a medium reservation message from a second wireless device indicating synchronization information for a synchronous contention window, perform a second clear channel assessment within the synchronous contention window to obtain access to the shared radio frequency band, and communicate, via the shared radio frequency band, data in accordance with the synchronization information based on the second clear channel assessment.

Some examples of the method, apparatuses, and non-transitory computer-readable medium described herein may further include operations, features, means, or instructions for transmitting, based on the asynchronous clear channel assessment, a transmission request message via the shared radio frequency band, where the medium reservation message may be received in response to the transmission request message.

In some examples of the method, apparatuses, and non-transitory computer-readable medium described herein, the synchronization information configures the first wireless device with the synchronous contention window in which to contend for access to the shared radio frequency band.

In some examples of the method, apparatuses, and non-transitory computer-readable medium described herein, communicating the data in accordance with the synchronization information further may include operations, features, means, or instructions for communicating the data to the second wireless device or a third wireless device beginning at a boundary between the synchronous contention window and a channel occupancy time, where the synchronization information indicates the boundary.

In some examples of the method, apparatuses, and non-transitory computer-readable medium described herein, the synchronization information includes a time shift relative to a synchronized clock time for indicating the boundary.

Some examples of the method, apparatuses, and non-transitory computer-readable medium described herein may further include operations, features, means, or instructions for transmitting a second medium reservation message including a synchronization indicator indicating the result of the second clear channel assessment, where the data may be communicated with the second wireless device or a third wireless device based on the second medium reservation message.

In some examples of the method, apparatuses, and non-transitory computer-readable medium described herein, the synchronization information indicates a duration of a channel occupancy time, a duration of the synchronous contention window, a duration in which the first wireless device is to maintain synchronization, or any combination thereof.

In some examples of the method, apparatuses, and non-transitory computer-readable medium described herein, communicating the data in accordance with the synchronization information further may include operations, features, means, or instructions for communicating the data within a duration of a channel occupancy time indicated in the synchronization information.

In some examples of the method, apparatuses, and non-transitory computer-readable medium described herein, the synchronization information indicates a first priority level of a set of different priority levels assigned to the first wireless device, and performing the second clear channel assessment further may include operations, features, means, or instructions for performing, within a first time duration of a set of different time durations of the synchronous contention window corresponding to the first priority level, the second clear channel assessment to contend for access to the shared radio frequency band.

In some examples of the method, apparatuses, and non-transitory computer-readable medium described herein, the first priority level may be based on a quality of service level for the data.

In some examples of the method, apparatuses, and non-transitory computer-readable medium described herein, the synchronization information indicates a first synchronization configuration of a set of synchronization configurations.

In some examples of the method, apparatuses, and non-transitory computer-readable medium described herein, each synchronization configuration of the set of synchronization configurations may have a different duration for a channel occupancy time, a different number of synchronous contention windows, or both.

In some examples of the method, apparatuses, and non-transitory computer-readable medium described herein, the synchronization information configures the first wireless device to transmit the synchronization information one or more times within a defined duration of time.

In some examples of the method, apparatuses, and non-transitory computer-readable medium described herein, the synchronization information configures the first wireless device to maintain synchronization within a defined duration of time.

Some examples of the method, apparatuses, and non-transitory computer-readable medium described herein may further include operations, features, means, or instructions for operating in an asynchronous mode based on determining that synchronization information may have not been received within the duration of time.

In some examples of the method, apparatuses, and non-transitory computer-readable medium described herein, the synchronization information includes a bit indicating whether a receipt time of the medium reservation message indicates a boundary between the synchronous contention window and a channel occupancy time.

In some examples of the method, apparatuses, and non-transitory computer-readable medium described herein, the synchronization information includes a bit indicating that the second wireless device may be synchronized within a time window for which the second wireless device may be capable of maintaining synchronization within a defined tolerance.

Some examples of the method, apparatuses, and non-transitory computer-readable medium described herein may further include operations, features, means, or instructions for monitoring for a second medium reservation message during the synchronous contention window indicated in the synchronization information.

In some examples of the method, apparatuses, and non-transitory computer-readable medium described herein, the medium reservation message may include operations, features, means, or instructions for communicating the data in accordance with the synchronization information based on the age information satisfying a threshold value.

In some examples of the method, apparatuses, and non-transitory computer-readable medium described herein, the medium reservation message may include operations, features, means, or instructions for adding a time offset to the age information to generate updated age information based on determining that the first wireless device may be not capable of maintaining synchronization for a defined duration of time and transmitting the synchronization information and the updated age information to a third wireless device.

A method of wireless communication at a first wireless device is described. The method may include receiving a medium reservation message from a second wireless device via a shared radio frequency band, transmitting, via the shared radio frequency band, a medium reservation response message indicating synchronization information for a synchronous contention window, and communicating, via the shared radio frequency band, data in accordance with the synchronization information.

An apparatus for wireless communication at a first wireless device is described. The apparatus may include a processor, memory in electronic communication with the processor, and instructions stored in the memory. The instructions may be executable by the processor to cause the apparatus to receive a medium reservation message from a second wireless device via a shared radio frequency band, transmit, via the shared radio frequency band, a medium reservation response message indicating synchronization information for a synchronous contention window, and communicate, via the shared radio frequency band, data in accordance with the synchronization information.

Another apparatus for wireless communication at a first wireless device is described. The apparatus may include means for receiving a medium reservation message from a second wireless device via a shared radio frequency band, transmitting, via the shared radio frequency band, a medium reservation response message indicating synchronization information for a synchronous contention window, and communicating, via the shared radio frequency band, data in accordance with the synchronization information.

A non-transitory computer-readable medium storing code for wireless communication at a first wireless device is described. The code may include instructions executable by a processor to receive a medium reservation message from a second wireless device via a shared radio frequency band, transmit, via the shared radio frequency band, a medium reservation response message indicating synchronization information for a synchronous contention window, and communicate, via the shared radio frequency band, data in accordance with the synchronization information.

In some examples of the method, apparatuses, and non-transitory computer-readable medium described herein, the synchronization information configures the second wireless device with the synchronous contention window in which to contend for access to the shared radio frequency band.

In some examples of the method, apparatuses, and non-transitory computer-readable medium described herein, communicating data further may include operations, features, means, or instructions for communicating the data to the second wireless device or a third wireless device beginning at a boundary between the synchronous contention window and a channel occupancy time, where the synchronization information indicates the boundary.

In some examples of the method, apparatuses, and non-transitory computer-readable medium described herein, the synchronization information includes a time shift relative to a synchronized clock time for indicating the boundary.

Some examples of the method, apparatuses, and non-transitory computer-readable medium described herein may further include operations, features, means, or instructions for receiving a second medium reservation message including a synchronization indicator indicating the result of a second clear channel assessment and transmitting a second medium reservation response message, where the data may be communicated in response to receiving the second medium reservation message.

In some examples of the method, apparatuses, and non-transitory computer-readable medium described herein, the synchronization information indicates a duration of a channel occupancy time, a duration of the synchronous contention window, a duration in which the first wireless device is to maintain synchronization, or any combination thereof.

In some examples of the method, apparatuses, and non-transitory computer-readable medium described herein, communicating data further may include operations, features, means, or instructions for communicating the data with the second wireless device or a third wireless device within a duration of a channel occupancy time indicated in the synchronization information.

In some examples of the method, apparatuses, and non-transitory computer-readable medium described herein, the synchronization information indicates a first priority level of a set of different priority levels assigned to the first wireless device and a first time duration of a set of different time durations of the synchronous contention window corresponding to the first priority level.

In some examples of the method, apparatuses, and non-transitory computer-readable medium described herein, the first priority level may be based on a quality of service level for the data.

In some examples of the method, apparatuses, and non-transitory computer-readable medium described herein, the synchronization information indicates a first synchronization configuration of a set of synchronization configurations.

In some examples of the method, apparatuses, and non-transitory computer-readable medium described herein, each synchronization configuration of the set of synchronization configurations may have a different duration for a channel occupancy time, a different number of synchronous contention windows, or both.

In some examples of the method, apparatuses, and non-transitory computer-readable medium described herein, the synchronization information configures the second wireless device to transmit the synchronization information one or more times within a defined duration of time.

In some examples of the method, apparatuses, and non-transitory computer-readable medium described herein, the synchronization information configures the second wireless device to maintain synchronization within a defined duration of time.

Some examples of the method, apparatuses, and non-transitory computer-readable medium described herein may further include operations, features, means, or instructions for operating in an asynchronous mode based on determining that second synchronization information may have not been received within the duration of time.

In some examples of the method, apparatuses, and non-transitory computer-readable medium described herein, the synchronization information includes a bit indicating whether a receipt time of the medium reservation response message indicates a boundary between the synchronous contention window and a channel occupancy time.

In some examples of the method, apparatuses, and non-transitory computer-readable medium described herein, the synchronization information includes a bit indicating that the first wireless device may be synchronized within a time window for which the first wireless device may be capable of maintaining synchronization within a defined tolerance.

Some examples of the method, apparatuses, and non-transitory computer-readable medium described herein may further include operations, features, means, or instructions for monitoring for a second medium reservation message during the synchronous contention window indicated in the synchronization information.

In some examples of the method, apparatuses, and non-transitory computer-readable medium described herein, the medium reservation response message includes age information for the synchronization information.

In some examples of the method, apparatuses, and non-transitory computer-readable medium described herein, the medium reservation message may include operations, features, means, or instructions for adding a time offset to the age information to generate updated age information based on determining that the first wireless device may be not capable of maintaining synchronization for a defined duration of time and transmitting the synchronization information and the updated age information to a third wireless device.

DETAILED DESCRIPTION

Figure 1:
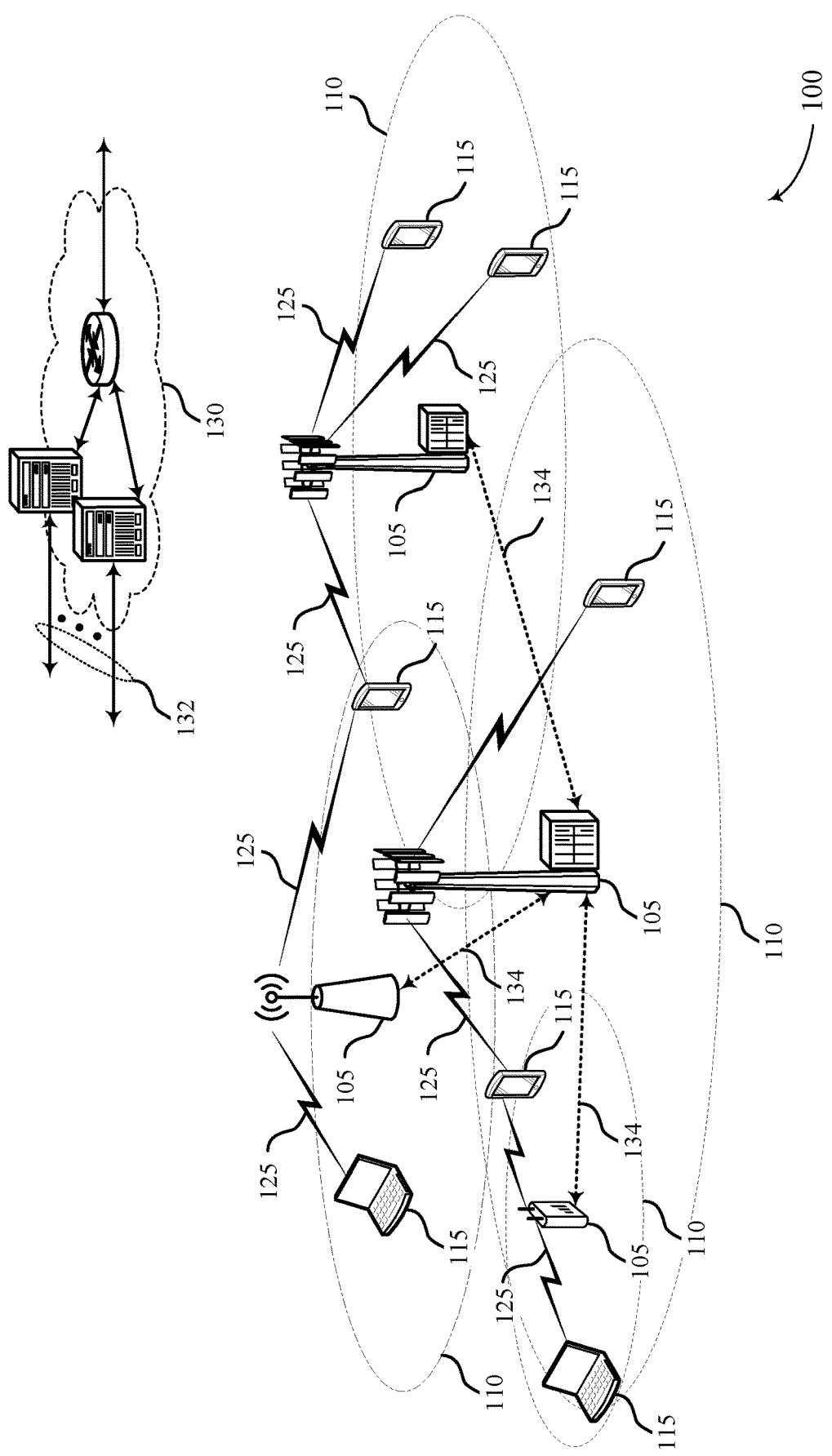
FIG. 1 illustrates an example of a system for wireless communications that supports a flexible synchronous and asynchronous access procedure in accordance with aspects of the present disclosure.

The described techniques provide medium reservation signaling that incorporates synchronization information for enhancing data exchange via a shared radio frequency band. Multiple wireless devices may use the synchronization information to synchronize windows in which to contend for the shared radio frequency band to reduce interference and enhance communication quality for transmissions via the shared radio frequency band.

In some wireless communications systems, a wireless device (e.g., an access point (AP), user equipment (UE), station (STA), etc.) may support a flexible synchronous and asynchronous medium access procedure prior to data communications within a shared radio frequency band (e.g., an unlicensed radio frequency spectrum or band). Conventional systems may provide randomized medium access, where a wireless device attempts to access the system asynchronously in an on-demand basis (e.g., at any time). Randomized medium access may decrease the probability of multiple devices attempting to simultaneously transmit data via the medium, thereby reducing interference and degraded performance that may be caused by simultaneous transmissions.

However, decreasing the probability of simultaneous transmissions may be insufficient for data services having certain quality of service (QoS) levels. For example, different wireless devices may operate according to a QoS level where access to a corresponding medium may be prioritized such that the decreased probability of simultaneous transmissions does not meet a specified QoS level. As such, techniques described herein may provide a flexible synchronous and asynchronous medium access procedure that synchronizes contention windows in which wireless devices may contend for access to a shared radio frequency medium access.

In some cases, to enable the flexible synchronous and asynchronous medium access procedure, a synchronizing wireless device (e.g., a UE or STA) may inform nearby wireless devices that attempt to use the shared radio frequency medium of a synchronous contention window alignment. The synchronizing wireless device may transmit synchronization information that indicates the synchronous contention window alignment, and nearby wireless devices may contend for access to the medium within any of the synchronous contention windows when attempting to obtain synchronized access to the medium (e.g., for multi-technology). The synchronization information may be included in medium reservation messages (e.g., request to send (RTS) and clear to send (CTS)) exchanged when a nearby wireless device attempts to access the medium, or in standalone message at least occasionally or periodically transmitted by the synchronizing wireless device to nearby wireless devices.

Additionally, the synchronization information may indicate when a current synchronous contention window begins or when a subsequent synchronous contention window begins. Accordingly, a second wireless device (e.g., an AP) may determine the synchronous contention window alignment based on the synchronization information included in one of the medium reservation messages (e.g., CTS message, reservation response message). Wireless devices that receive the synchronization information may identify a beginning and a duration a contention window and may set an associated timer as indicated by the synchronization information. The timer may specify a time period during which a wireless device is to contend for the medium within at least one of the contention windows. If the timer expires, and a subsequent instance of the synchronization information has not been received, a wireless device may have the option to revert to operating in an asynchronous manner, and hence may contend for the medium in an on-demand basis (e.g., is not limited to contending for the medium within one of the synchronous contention windows).

In some examples, information about the age of the synchronization information may be included within the corresponding medium reservation message to indicate an elapsed time since the medium reservation message and/or synchronization information was generated. If the elapsed time is less than a threshold time value (e.g., satisfies a threshold), a wireless device that receives the medium reservation message may read the message and then may transition to synchronous operation. Additionally, a wireless device may be unable to maintain synchronization and/or continuously maintain a reference system time (e.g., an absolute system time). Accordingly, when a wireless device receives the information about the age of the synchronization information, the wireless device may further "age" the synchronization information by adding a timing offset to the age of the synchronization information. For example, the timing offset may indicate a time between receiving the synchronization information and transmitting it to a subsequent wireless device. As such, the age of the synchronization information may be maintained for wireless devices that are unable to maintain synchronization by continually updating the age when a wireless device passes the synchronization information along.

In some cases, an asynchronous node (e.g., AP) may receive the synchronization information from nodes (e.g., STAs or base stations) that it does not serve. As described herein, the synchronization information may include information about a synchronous contention window for contending for the shared radio frequency band. Initially, the asynchronous node may perform an asynchronous clear channel assessment on the shared radio frequency band. In some cases, the asynchronous node may then receive a medium reservation message with the synchronization information. Accordingly, the asynchronous node may then perform a second clear channel assessment within the synchronous contention window indicated by the synchronization information. If the shared radio frequency band is determined to be available based on the second clear channel assessment, the asynchronous node may synchronously communicate with another wireless device in accordance with the synchronization information. Accordingly, a synchronized medium access procedure described herein based on aligned synchronous contention windows may improve QoS for the system and wireless devices operating therein.

Aspects of the disclosure are initially described in the context of a wireless communications system. An additional wireless communications system, examples of contention timelines, process flows, and a flow diagram are then provided to describe aspects of the disclosure. Aspects of the disclosure are further illustrated by and described with reference to apparatus diagrams, system diagrams, and flowcharts that relate to flexible synchronous and asynchronous access procedure.

FIG. 1 illustrates an example of a wireless communications system 100 that supports flexible synchronous and asynchronous access procedure in accordance with aspects of the present disclosure. The wireless communications system 100 includes base stations 105, UEs 115, and a core network 130. In some examples, the wireless communications system 100 may be a Long-Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like. In some cases, base stations 105 may include APs 105, which may provide access to a wireless local area network (WLAN) for one or more UEs 115. Additionally, the WLAN can be a network implementing at least one of the IEEE 802.11 family of standards.

Each base station 105 and AP 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like. In some cases, UEs 115 may include STAs 115 that communicate with base stations 105 or APs 105 over a WLAN.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform-spread OFDM (DFT-s-OFDM)).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Prior to exchanging data, wireless devices in wireless communications system 100 may perform a clear channel assessment to determine if a medium is available. In some cases, the wireless devices may utilize randomized medium access, where a first wireless device attempts to access the system asynchronously in an on-demand basis (e.g., at any time). Accordingly, the randomized medium access may decrease the probability of multiple devices attempting to access the medium and transmitting data simultaneously. However, decreasing the probability of simultaneous transmissions may be insufficient for different QoS levels within the system. For example, different wireless devices may operate according to a QoS level where access to a corresponding medium may be prioritized such that the decreased probability of simultaneous transmissions does not meet the QoS level.

Wireless communications system 100 may support efficient techniques for providing a medium access procedure for a shared radio frequency band. For example, a flexible synchronous and asynchronous medium access procedure may be employed. A wireless device (e.g., a UE or STA) may support synchronous contention window alignment for accessing the medium to develop an access procedure for synchronized medium access (e.g., for multi-technology). Synchronization information indicating whether the wireless device utilizes the synchronous contention window alignment may be included in medium reservation messages (e.g., RTS/CTS) or in standalone messages to achieve a synchronized medium contention window for one or more wireless devices. Additionally, the synchronization information may include when a current contention window began or when a subsequent contention window may begin.

Accordingly, a second wireless device (e.g., an AP) may determine the synchronous contention window alignment based on the synchronization information included in the medium reservation messages. Wireless devices that receive the synchronization information may set a contention window and an associated timer as indicated by the synchronization information, where the wireless devices may contend for the medium within the contention window. If the timer expires and a subsequent instance of the synchronization information is not received, the second wireless device may resume using an asynchronous medium access procedure (e.g., contending for the medium outside of the configured contention windows).

Accordingly, a medium access procedure described herein based on a synchronous contention window may improve QoS for the system and corresponding wireless devices. Initially, a first wireless device may perform a clear channel assessment to determine if a medium is available for communications with a second wireless device. If the clear channel assessment indicates the medium is clear, the first wireless device may then transmit an RTS message to the second wireless device. Based on the successful clear channel assessment and receiving the RTS message, the second wireless device may transmit a CTS message to the first wireless device configuring subsequent communications with the second wireless device on the medium. In some cases, the first wireless device may transmit the RTS and perform the clear channel assessment on an on-demand basis when data is identified for the second wireless device. However, performing clear channel assessments according to an on-demand basis may limit access to the medium and provide a lower QoS to wireless devices in the system.

In some cases, an asynchronous node (e.g., AP) may receive the synchronization information from one or more nodes (e.g., STAs or base stations) that it does or might not serve. As described herein, the synchronization information may include information about a synchronous contention window for contending for the shared radio frequency band. Initially, the asynchronous node may perform an asynchronous clear channel assessment on the shared radio frequency band. In some cases, the asynchronous node may then receive a medium reservation message with the synchronization information. Accordingly, the asynchronous node may then perform a second clear channel assessment within the synchronous contention window indicated by the synchronization information. If the shared radio frequency band is determined to be available based on the second clear channel assessment, the asynchronous node may synchronously communicate with another wireless device in accordance with the synchronization information. In accordance with the examples described herein, synchronization information may be communicated within medium reservation signaling for synchronizing contention windows in which multiple wireless devices may contend for access to a shared radio frequency band.

Figure 2:
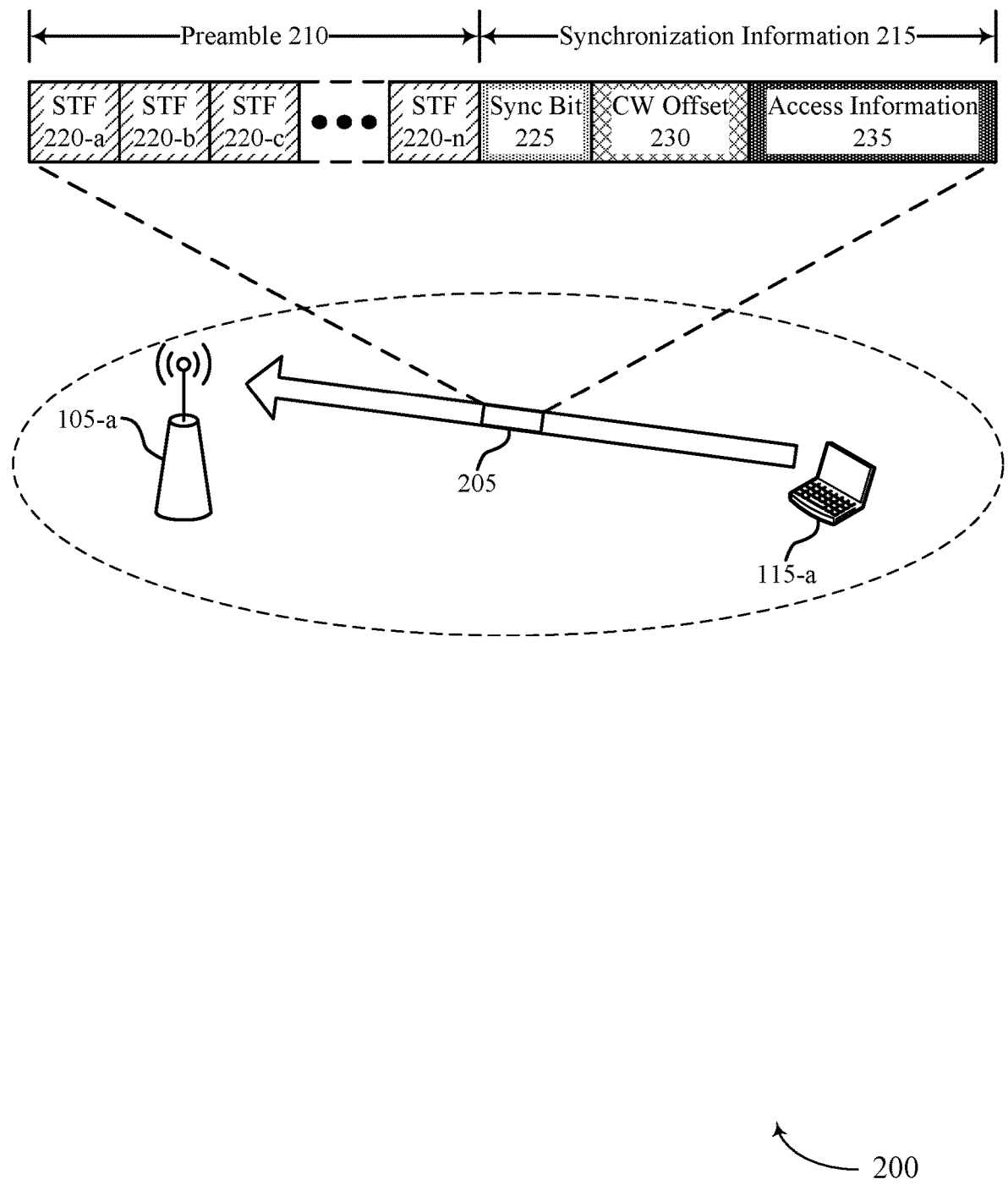
FIG. 2 illustrates an example of a wireless communications system that supports a flexible synchronous and asynchronous access procedure in accordance with aspects of the present disclosure.

FIG. 2 illustrates an example of a wireless communications system 200 that supports a flexible synchronous and asynchronous access procedure in accordance with aspects of the present disclosure. In some examples, wireless communications system 200 may implement aspects of wireless communications system 100. Wireless communications system 200 may include an AP 105-a and a STA 115-a, which may be examples of an AP 105 (e.g., or a base station 105) and STA 115 (e.g., or a UE 115), respectively, as described with reference to FIG. 1. Additionally, wireless communications system 200 may support shared radio frequency bands where AP 105-a may contend for a medium (e.g., a shared radio frequency band, an unlicensed radio frequency band, or the like) with other APs 105 to communicate with STA 115-a. Accordingly, AP 105-a may initiate and perform a clear channel assessment to determine if the medium is available for communications with STA 115-a (e.g., no other wireless devices are utilizing the medium). If the clear channel assessment indicates the medium is available, AP 105-a may transmit an RTS message (e.g., a medium reservation message) to STA 115-a to establish communications with STA 115-a (e.g., perform a handshake procedure). STA 115-a may then transmit a CTS 205 (e.g., reservation response message) to AP 105-a based on the clear channel assessment indicating the medium is available for communications and receiving the RTS message.

In some cases, STA 115-a (e.g., a wireless device or node) in wireless communications system 200 may transmit a timing synchronization signal that can be detected by other wireless devices (e.g., APs 105, base stations 105, STAs 115, UEs 115, etc.) in the system when AP 105-a accesses a medium with STA 115-a (e.g., a shared radio frequency band). For example, STA 115-a may transmit CTS 205 after AP 105-a accesses the medium, where CTS 205 includes the timing synchronization signal. The timing synchronization signal may contain a preamble 210 and synchronization information 215. In some cases, preamble 210 may contain one or more short training fields (STFs) 220 or a signal with a similar structure. STFs 220 may enable AP 105-a to detect the timing synchronization signal (e.g., or additional signaling), perform frequency offset estimation, timing synchronization, etc. For example, STFs 220 may support a coarse synchronization between STA 115-a and AP 105-a.

Additionally, a rule may be determined to indicate if AP 105-a may change its timing and what a timing shift should be for changing the timing. Accordingly, synchronization information 215 may contain information related to medium access synchronization for an AP 105-a. For example, synchronization information 215 may include a synchronization bit 225 that indicates whether the wireless device is synchronized in terms of a contention window (CW) boundary (e.g., whether a synchronized procedure was used when contending for the medium), when a current channel occupancy time began, the beginning of a subsequent CW, a CW offset 230 (e.g., timing shift), and access information 235 (e.g., information related to the CW size and channel occupancy time).

In some cases, synchronization bit 225 may be set to "TRUE" if STA 115-a has been synchronized within a time window (e.g., CW) for which it can maintain synchronization within a certain tolerance. For example, the synchronization bit may be set to "TRUE" if STA 115-a can maintain (e.g., guarantee) a drift within a threshold (e.g., less than ±5 µs) compared to a wireless device that enabled synchronization. Additionally, CW offset 230 and access information 235 may indicate whether an entire channel occupancy time is utilized by STA 115-a and when a subsequent CW may begin so that AP 105-a may determine when to begin contending for the medium.

If the entire channel occupancy time is utilized, CW offset 230 may indicate that no time shift is included and other wireless devices in the system (e.g., AP 105-a and additional APs 105) may determine that a subsequent CW after the channel occupancy time may begin once the channel occupancy time ends. If the entire channel occupancy time is not utilized, the other wireless devices may use the CW offset 230 (e.g., timing shift) to determine when the subsequent CW begins and contend for the medium based on the determined beginning of the CW. Additionally or alternatively, the other wireless devices may determine the beginning of the subsequent CW (e.g., a next occurrence of the synchronous contention window) based on the size of the channel occupancy time and whether it was a synchronized procedure (e.g., from synchronization bit 225). In some cases, the timing synchronization signal may be part of a medium reservation signal (e.g., RTS/CTS). For example, synchronization information 215 may resemble an RTS/CTS structure or an alternative design.

Synchronization information 215 may be added into up to each medium reservation messages (e.g., RTS/CTS) or may be placed in stand-alone messages (e.g., for NR). In some examples, the decoding of medium reservation messages (e.g., that may include synchronization information 215) may be mandatory for a wireless device that receives a medium reservation message (e.g., AP 105-a). In some cases, the wireless device that receives the synchronization information may optionally transmit a response to the synchronization information based on if synchronization bit 225 is received or not within synchronization information 215. If received, the wireless device may subsequently transmit the synchronization information 215. If not received, the wireless device may have the option of whether to transmit the synchronization information 215.

Additionally, each wireless device that receives synchronization information for medium contention may start a contention window as indicated in the synchronization information, assign a synchronization bit to a defined value (e.g., "TRUE"), and transmit synchronization information 215 and the synchronization bit (e.g., to other STAs or APs or in reply to the message that included the synchronization information 215). For example, STA 115-a may receive synchronization configuration information from a base station 105 and transmit synchronization information 215 based on the configuration. Additionally or alternatively, AP 105-a may receive synchronization information 215 from STA 115-a and communicate according to a synchronous configuration indicated in synchronization information 215.

In some cases, wireless devices may not be able to maintain synchronization and, as such, may fall back to an asynchronous access procedure for contending for the medium. For example, AP 105-a may maintain a synchronization timer based on when the last synchronization information was received. If this synchronization timer expires and a subsequent instance of the synchronization information has not been received, AP 105-a may fall back to an asynchronous access procedure (e.g., aperiodically transmitting an RTS when data is identified to be communicated). Additionally, synchronized wireless devices (e.g., in supervisory roles such as a base station, gNB, or AP) may transmit synchronization signals at least occasionally or periodically to enable synchronization to nearby asynchronous wireless devices.

Some wireless devices may operate in a supervised role. For example, STAs 115 may operate in a supervised role when positioned near to one or more synchronized wireless devices (e.g., synchronized base stations or APs 105). Wireless devices operating in the supervised role may include synchronization information in messages sent to serving or supervising devices (e.g., an AP 105). In some cases, a synchronized wireless device may not read, or may have the option to skip reading, medium reservation messages that fall outside the CW for the synchronized wireless device.

The flexible synchronous and asynchronous medium access procedure, as described herein, may promote synchronized access for one or more wireless devices in a system. In some examples, synchronized access may be relatively loose, and the one or more wireless devices may maintain a rough time alignment of the CW for attempting to access the medium. Additionally or alternatively, asynchronous access may be utilized in the absence of wireless devices providing synchronization in the area. Otherwise, other than a possible initial transmission of medium reservation messages (e.g., RTS/CTS) when the node is not yet operating with synchronous contention windows (e.g., out of synchronization), transmission of up to all other signals may be limited to a successful clear channel assessment within the synchronization CW.

In some cases, AP 105-a may be an asynchronous node (e.g., AP). Accordingly, AP 105-a may receive the synchronization information from a node (e.g., STAs or base stations) that it does or might not serve, where the synchronization information may include information about the synchronous contention window for contending for the shared radio frequency band. In some cases, AP 105-a may perform an asynchronous clear channel assessment on the shared radio frequency band (e.g., based on being an asynchronous node). AP 105-a may receive a medium reservation message with the synchronization information 215. Accordingly, AP 105-a may then perform a second clear channel assessment within the synchronous contention window indicated by the synchronization information 215. If the shared radio frequency band is determined to be available based on the second clear channel assessment, AP 105-a may synchronously communicate with another wireless device (e.g., STA 115-a) in accordance with the synchronization information 215.

Some nodes may be able to maintain a reference system time (e.g., an absolute system time). For example, global positioning system (GPS) connected nodes may include this ability. As such, based on the reference system time, the nodes may provide a reference system time for indicating a start of a CW. Nodes that are unable to maintain (e.g., unable to continuously maintain) the reference system time may relay synchronization information 215 while such nodes are capable of maintaining synchronization (e.g., operated in a synchronized state). The nodes that are unable to maintain the reference system time may transition from an asynchronous state to a synchronized state if synchronization information 215 is received in a message (e.g., a reference signal, reservation response message, etc.) that includes an active synchronized state flag. Additionally or alternatively, these nodes may transition from a synchronized state to an asynchronous state when no message is received after the synchronization timer expires. In some cases, the nodes may reset the synchronization timer each time an active synchronized state flag is received.

Information about the age of synchronization information 215 may be included within a corresponding message (e.g., a reservation response message) to indicate an elapsed time since the synchronization information 215 was generated (e.g., a duration for how long a node can be assumed to remained synchronized) by a node (e.g., a GPS synchronized node). Other access information, such as information possibly related to a window size of a CW and channel occupancy time may be included as well with the synchronization information 215. The age information for the synchronization information 215 may be used by a node to determine the duration for how long a node may be assumed to remained synchronized, and each node may relay synchronization information 215 and age information for the synchronization information 215.

If the age information (e.g., elapsed time) is less than a threshold time value (e.g., satisfies a threshold), a wireless device that receives the medium reservation message (e.g., AP 105-a) may read the message and then may transition to a synchronized state. In some cases, AP 105-a may be aligned with additional APs 105, where each AP 105 can be in either a synchronized or asynchronous state. The synchronization information 215 and/or a state in which the node is operating (e.g., a synchronized state or an asynchronous state) may be conveyed to neighboring nodes (e.g., APs 105, UEs 115, STAs 115, etc.) in AP reference signals sent periodically (e.g., every 40 ms to neighbor nodes). The reference signal may also include parameters, such as, a duration of a CW and COT (e.g., CW+COT=5 ms), a duration of a CW (e.g., CW=0.5 ms), and a frequency in which a reference signal is sent (e.g., every 40 ms). Each UE 115 or STA 115 may transmit the age information with the synchronization information to indicate whether or not they have "recently" received a reference signal from an AP 105.

In some examples, a series of nodes may be geographically oriented relative to one another (e.g., in a somewhat linear order). An innermost node in the series may maintain the reference system time and pass the synchronization information 215 (e.g., in a reservation response message) to a second node in the series. Each node may in turn relay the synchronization information 215 to a subsequent node in the series, with each subsequent node potentially becoming farther away from the innermost node. When the series of nodes (e.g., APs 105 that are somewhat aligned) relay the synchronization information 215 (e.g., in a reference signal, in a message, or the like), binary control of the synchronization information 215 may, in some cases, create a "wave" effect that makes nodes in the middle of the series operate synchronously more frequently than nodes that are closer to the innermost node (e.g., GPS-equipped STA or AP) that maintains the reference system time.

To prevent these nodes farther away from operating in a synchronized state, age information for the synchronization information 215 may be included in a message (e.g., a reservation response message) that is relayed to a subsequent node in the series. As such, if the age of the synchronization information 215 does not satisfy a threshold time value (e.g., the age of the synchronization information 215 is greater than the threshold time value), the reservation response message may be ignored by the subsequent node and the subsequent node may not transition from an asynchronous state to a synchronized state. Also, the node may determine not to relay the synchronization information 215 to other subsequent nodes in the series. In some examples, the threshold time value may be the same as the duration of the expiration time for the synchronization timer as described herein.

Each node that propagates a message (e.g., the reservation response message, a reference signal, etc.) may add a difference in timestamps between the reception and transmission of the reservation response message to received age information (e.g., add a time offset). For example, every node (e.g., UE, STA, gNB, AP, etc.) that propagates this message may add to the message the difference in timestamps between the reception and the transmission of such message. For example, STA 115-a may receive, from a base station 105, synchronization information 215 that includes age information to corresponding to when the synchronization information 215 was generated. STA 115-a may add the time STA 115-a took to process and forward synchronization information 215 (e.g., time $t_1$) to the age information included with synchronization information 215, to generate current age information (e.g., $t_0+t_1$). STA 115-a may forward synchronization information 215 (e.g., within the reservation response message) with the current age information (e.g., $t_0+t_1$) to AP 105-a. AP 105-a may similarly add the time it took to process and forward synchronization information 215 (e.g., time $t_2$) to the current age information included with synchronization information 215, to generate updated current age information (e.g., $t_0+t_1+t_2$). AP 105-a may forward synchronization information 215 (e.g., within the reservation response message) with the updated current age information (e.g., $t_0+t_1+t_2$) to a subsequent node. Thus, each node in a series may determine a current age of the synchronization information 215, and may use the current age for determining whether to enter a synchronized state or ignore the synchronization information 215 if it is too old (e.g., if a sync message is received with age>threshold, the message is ignored and does not lead to an asynchronous to synchronized transition). Beneficially, the age information may be used to lessen the likelihood of a wave effect occurring within a series of nodes, and may reduce frequency in which nodes more than a defined number of hops (e.g., 3 hops) away from the innermost node enter a synchronized state. Additionally, the age of the synchronization information may be maintained for wireless devices that are unable to maintain synchronization by continually updating the age when a wireless device passes the synchronization information along.

Figure 3A:
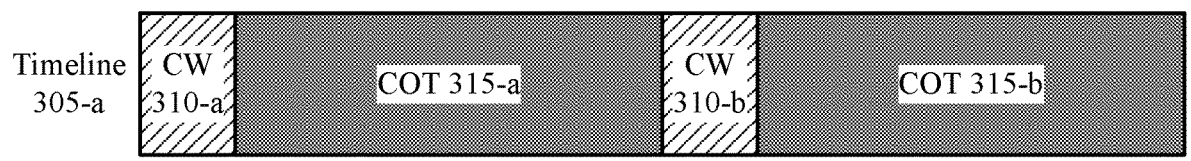
FIGS. 3A and 3B illustrate examples of contention timelines that support a flexible synchronous and asynchronous access procedure in accordance with aspects of the present disclosure.
Figure 3B:
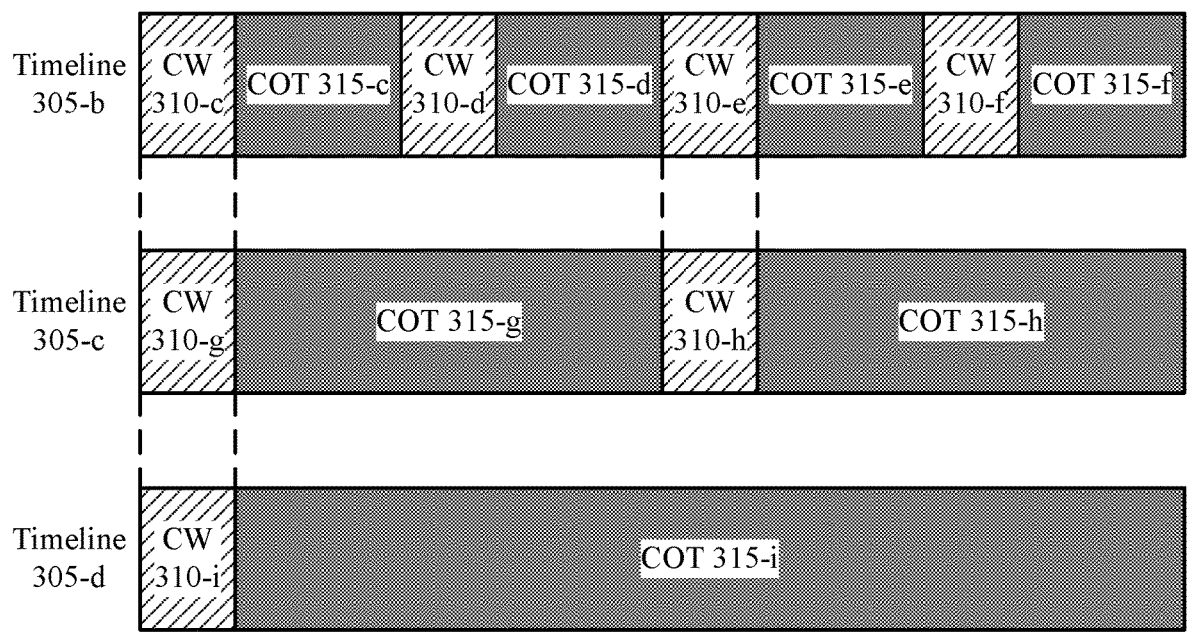

FIGS. 3A and 3B illustrate examples of contention timelines 300 and 301 that support a flexible synchronous and asynchronous access procedure in accordance with aspects of the present disclosure. In some examples, contention timelines 300 and 301 may implement aspects of wireless communications systems 100 and/or 200. A STA 115 (e.g., or UE 115) may be configured with one or more timelines 305 that include one or more CWs 310 and corresponding channel occupancy times (COTs) 315. In some cases, the configurations may be received from a base station 105, where the locations (e.g., timings) of the CWs 310 may be predetermined for synchronous operations. The STA 115 may indicate these configurations to other wireless devices (e.g., APs 105) to enable synchronous access procedures.

CWs 310 and COTs 315 may have a fixed maximum size. In some cases, the CWs 310 may indicate time periods during which one or more wireless devices can contend for a medium (e.g., a shared radio frequency band). Additionally, the COTs 315 may indicate time periods during which a wireless device that wins the contention for the medium may access the medium (e.g., for data communications with a second wireless device). Medium access may be prioritized within a CW 310 based on a QoS for the one or more wireless devices contending for the medium. For example, a first wireless device may include a first priority associated with a first QoS, and a second wireless device may include a second priority associated with a second QoS, where the first priority may be higher than the second priority. Accordingly, based on the higher priority, the first wireless device may attempt to access the medium before the second wireless device (e.g., by contending for the medium in the first half of the timeline 305). Additionally or alternatively, the second wireless device may wait a period of time before contending for the medium (e.g., in the second half of the timeline 305), allowing the first wireless device precedence to attempting to access the medium in the timeline 305. Medium access priorities for the one or more wireless devices may change over time.

In some examples, timelines 305 for CWs 310 and corresponding COTs 315 may be derived from a system time (e.g., an absolute system time) and specified for a system (e.g., through a base station 105). For example, as shown in FIG. 3A, timeline 305-a may include a first CW 310-a with a corresponding first COT 315-a and a second CW 310-b with a corresponding second COT 315-b. The location of each CW 310 may be derived from the absolute system time for a wireless communications system and may be predetermined for any wireless device within the wireless communications system. Accordingly, CWs 310 may be synchronized for all wireless devices in the wireless communications system, which may allow for equal contention opportunities when attempting to access the medium for a particular wireless device (e.g., a STA 115).

In some cases, as described herein with reference to FIG. 2, a first wireless device (e.g., a STA 115) may transmit synchronization information to a second wireless device (e.g., an AP 105) when the second wireless device is attempting to access a medium for communicating with the first wireless device. The synchronization information may include the configuration of timeline 305-a. In some cases, the synchronization information may indicate for the second wireless device to communicate with the first wireless device beginning at a boundary between CW 310-a and COT 315-a or at any time during COT 315-a.

Additionally or alternatively, the synchronization information may indicate a timing shift such that the second wireless device may determine when CW 310-b starts and begin communicating with the first wireless device at a boundary between CW 310-b and COT 315-b. For example, if the second wireless device initially requests to send data to the first wireless device during COT 315-a, the medium may be occupied at the time by a different wireless device communicating with the first wireless device. Accordingly, the first wireless device may indicate the start of CW 310-b such that the second wireless device may determine when to contend for the medium, and if the contention is successful (e.g., through a clear channel assessment), when to communicate with the first wireless device beginning at the boundary between CW 310-b and COT 315-b.

As shown in FIG. 3B, the medium access may have a nested structure with variable COT 315 durations. For example, timelines 305 for CWs 310 and corresponding COTs 315 may differ across different resource sets, where the number of CWs 310 and/or the durations of the corresponding COTs 315 may differ for each resource set. A first set of resources may include a first timeline 305-b with a first COT duration for COTs 315-c, 315-d, 315-e, and 315-f.

Additionally, a second set of resources may include a second timeline 305-c with a second COT duration for COTs 315-g and 315-h, where the second COT duration may be longer than the first COT duration. A third set of resources may include a third timeline 305-d with a third COT duration longer than both the first COT duration and the second COT duration. However, while the COT durations may differ, CWs 310 in the different resource sets may be aligned at predetermined times such that wireless devices in the system may contend for the medium simultaneously. For example, CW 310-c in first timeline 305-b, CW 310-g in second timeline 305-c, and CW 310-i in third timeline 305-d may be aligned in time. Additionally, CW 310-e in first timeline 305-b and CW 310-h in second timeline 305-c may be aligned in time. The one or more different timeline configurations may be indicated within the synchronization information. As described herein, medium access may be prioritized within timelines 305 on each set of resources for one or more wireless devices contending for the medium based on a corresponding QoS for each of the one or more wireless devices.

Figure 4:
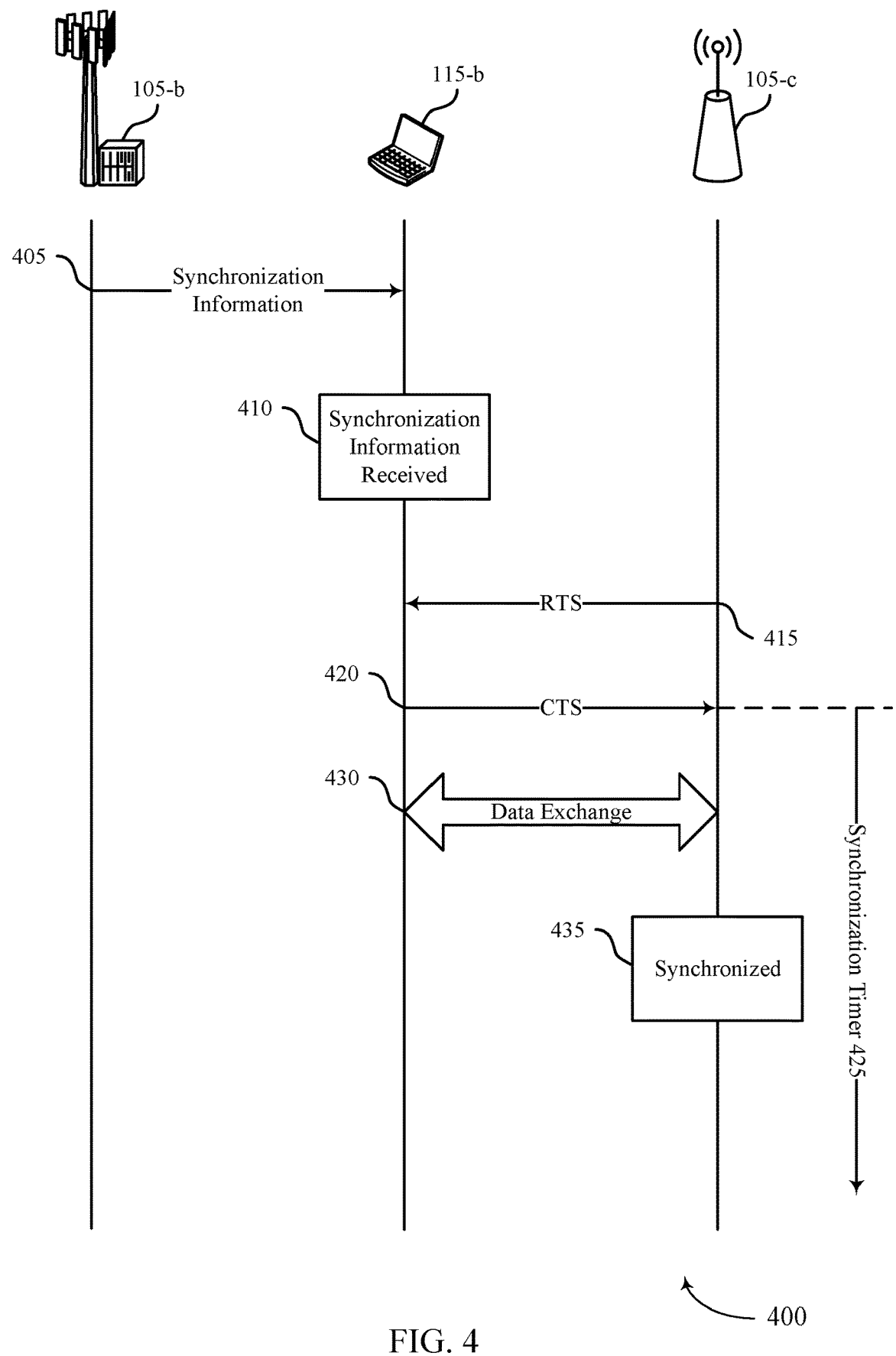
FIGS. 4 and 5 illustrate examples of process flows that support a flexible synchronous and asynchronous access procedure in accordance with aspects of the present disclosure.

FIG. 4 illustrates an example of a process flow 400 that supports a flexible synchronous and asynchronous access procedure in accordance with aspects of the present disclosure. In some examples, process flow 400 may implement aspects of wireless communications systems 100 and/or 200. Process flow 400 may include a base station 105-b, a STA 115-b, and an AP 105-c, which may be examples of base stations or APs 105 and STAs or UEs 115 as described with reference to FIGS. 1-3. In some cases, base station 105-b may operate synchronously. Additionally or alternatively, STA 115-b and AP 105-c may initially be configured to operate asynchronously. As described herein, AP 105-c may contend for access to a medium to communicate with STA 115-b.

In the following description of the process flow 400, the operations between base station 105-b, STA 115-b, and AP 105-c may be performed in different orders or at different times. Certain operations may also be left out of the process flow 400, or other operations may be added to the process flow 400. It is to be understood that while STA 115-b and AP 105-c are shown performing a number of the operations of process flow 400, any wireless device may perform the operations shown. For example, the operations performed by STA 115-b may be similarly be performed by an AP 105.

At 405, base station 105-b may transmit synchronization information to STA 115-b. In some cases, the synchronization information may be broadcasted by base station 105-b. Accordingly, at 410, STA 115-b may receive the synchronization information from base station 105-b (e.g., through a broadcast transmission). Based on receiving the synchronization information, STA 115-b may subsequently operate synchronously.

At 415, AP 105-c may transmit an RTS message (e.g., a medium reservation message) to STA 115-b. For example, AP 105-c may determine to perform a clear channel assessment to obtain access to a shared radio frequency band (e.g., the medium) based on identifying data to be communicated with STA 115-b. If a result of the clear channel assessment indicates that the medium is available, AP 105-c may transmit the RTS message. Since AP 105-c may initially be configured to operate asynchronously, the RTS message may not include synchronization information and may be transmitted in an on-demand basis (e.g., when the data is identified to be communicated).

At 420, STA 115-b may transmit a CTS message (e.g., a reservation response message) to AP 105-c. In some cases, the CTS message may indicate synchronization information for synchronizing with STA 115-*b*. For example, the synchronization information may configure AP 105-*c* with at least a synchronous contention window in which to contend for access to the shared radio frequency band.

Additionally or alternatively, the synchronization information may indicate a duration of a channel occupancy time, a duration of a synchronous contention window, a duration in which AP 105-*c* is to maintain synchronization with STA 115-*b*, or any combination thereof. As described herein with reference to FIG. 3B, the synchronization information may indicate a first synchronization configuration of a plurality of synchronization configurations (e.g., different contention timelines). For example, each synchronization configuration of the plurality of synchronization configurations has a different duration for a channel occupancy time, a different number of synchronous contention windows, or both. The synchronization information may configure AP 105-*c* to transmit the synchronization information one or more times within a defined duration of time.

In some cases, the synchronization information may include a bit indicating whether a receipt time of the reservation response message indicates a boundary between a synchronization contention window and a channel occupancy time. Additionally or alternatively, the synchronization information may include a bit indicating that the second wireless device is synchronized within a time window for which the second wireless device is capable of maintaining synchronization within a defined tolerance. The synchronization information may further include a time shift relative to a synchronized clock time for indicating a boundary between a synchronous contention window and a channel occupancy time.

Additionally, the synchronization information may include age information (e.g., staleness information) for the synchronization information (e.g., an elapsed time since the synchronization information was generated). As described herein with reference to FIG. 2, one or more nodes in a series of nodes may be unable to continuously maintain a reference system time. When these nodes receive the synchronization information from an earlier node in the series, the nodes may update the age information when passing the synchronization information along to a subsequent node in the series. If a node receives the reservation response message where the age information indicates that the synchronization information was not generated too far in the past (e.g., age information is less than the threshold time value), the node may transition to operate in a synchronized state. If, however, a node receives the reservation response message where the age information indicates that the synchronization information was generated too far in the past, the node may ignore the synchronization information 215 and not transition to a synchronized state. For example, if the age of synchronization information 215 included in a reservation response message (e.g., as indicated by the age information) is greater than a threshold time value, then the node may ignore the reservation response message.

In some cases, AP 105-*c* may receive the synchronization information in a separate medium reservation message from a wireless device it does not serve (e.g., base station 105-*b* or STA 115 not shown). AP 105-*c* may receive the separate medium reservation message based on performing an asynchronous clear channel assessment to obtain access to the shared radio frequency message (e.g., AP 105-*c* may be an asynchronous node and asynchronously communicate on the shared radio frequency band initially). After receiving the synchronization information in the separate medium reservation message, AP 105-*c* may then perform a synchronous clear channel assessment (e.g., second clear channel assessment) within a synchronous contention window indicated by the synchronization information.

At 425, a synchronization timer may be started after receiving the synchronization information in the CTS message. For example, the synchronization information may configure AP 105-*c* to maintain synchronization within a defined duration of time measured by the synchronization timer. If the synchronization timer expires, AP 105-*c* may operate in an asynchronous mode based on determining that synchronization information has not been received within the duration of time. In some cases, the duration of the synchronization timer (e.g., length of time after which the time expires) may be used as the threshold time value for determining whether to transition to the synchronized state. For example, if the synchronization timer would expire within the amount of time indicated by the age information, then AP 105-*c* may skip entering the synchronized state. In an example, AP 105-*c* may determine to transition to the synchronized state based on the age information (e.g., the age information is less than a threshold) included in the CTS message, and the process flow 400 may continue. Additionally, a wireless device may be unable to maintain synchronization and/or continuously maintain an absolute system time. Accordingly, when the wireless device (e.g., AP 105-*c*) receives the information about the age information, the wireless device may further "age" the synchronization information by adding a timing offset to the age information. For example, the timing offset may indicate a time between receiving the synchronization information and transmitting it to a subsequent wireless device. As such, the age of the synchronization information may be maintained for wireless devices that are unable to maintain synchronization by continually updating the age when a wireless device passes the synchronization information along.

At 430, data may be exchanged between STA 115-*b* and AP 105-*c*. For example, STA 115-*b* and AP 105-*c* may communicate, via the shared radio frequency band, data with the second wireless device in accordance with the synchronization information. In some cases, AP 105-*c* may communicate the data to STA 115-*b* beginning at a boundary between a synchronous contention window and a channel occupancy time, where the synchronization information indicates the boundary. Additionally or alternatively, AP 105-*c* may communicate the data with STA 115-*b* within a duration of a channel occupancy time indicated in the synchronization information. As such, AP 105-*c* (e.g., an asynchronous node) may gain the medium within the synchronous contention window and transmit a message to STA 115-*b* after gaining the medium and receiving the synchronization information. In some cases, the message may be terminated at the boundary between a channel occupancy timer and a subsequent contention window.

At 435, AP 105-*c* may be synchronized (e.g., locations of contention windows and channel occupancy times may be synchronized) based on the synchronization information received in the CTS message until that timer (e.g., synchronization timer 425) expires. Additionally or alternatively, AP 105-*c* may be synchronized based on the separate medium reservation message when initially operating asynchronously. The AP 105-*c* may restart the timer if it receives a subsequent instance of the synchronization information prior to expiration of the timer. If the timer expires without receiving a subsequent instance of the synchronization information, the AP 105-*c* may have the option to operate using an asynchronous access procedure and may contend for access without regard to a synchronous contention windows.

Figure 5:
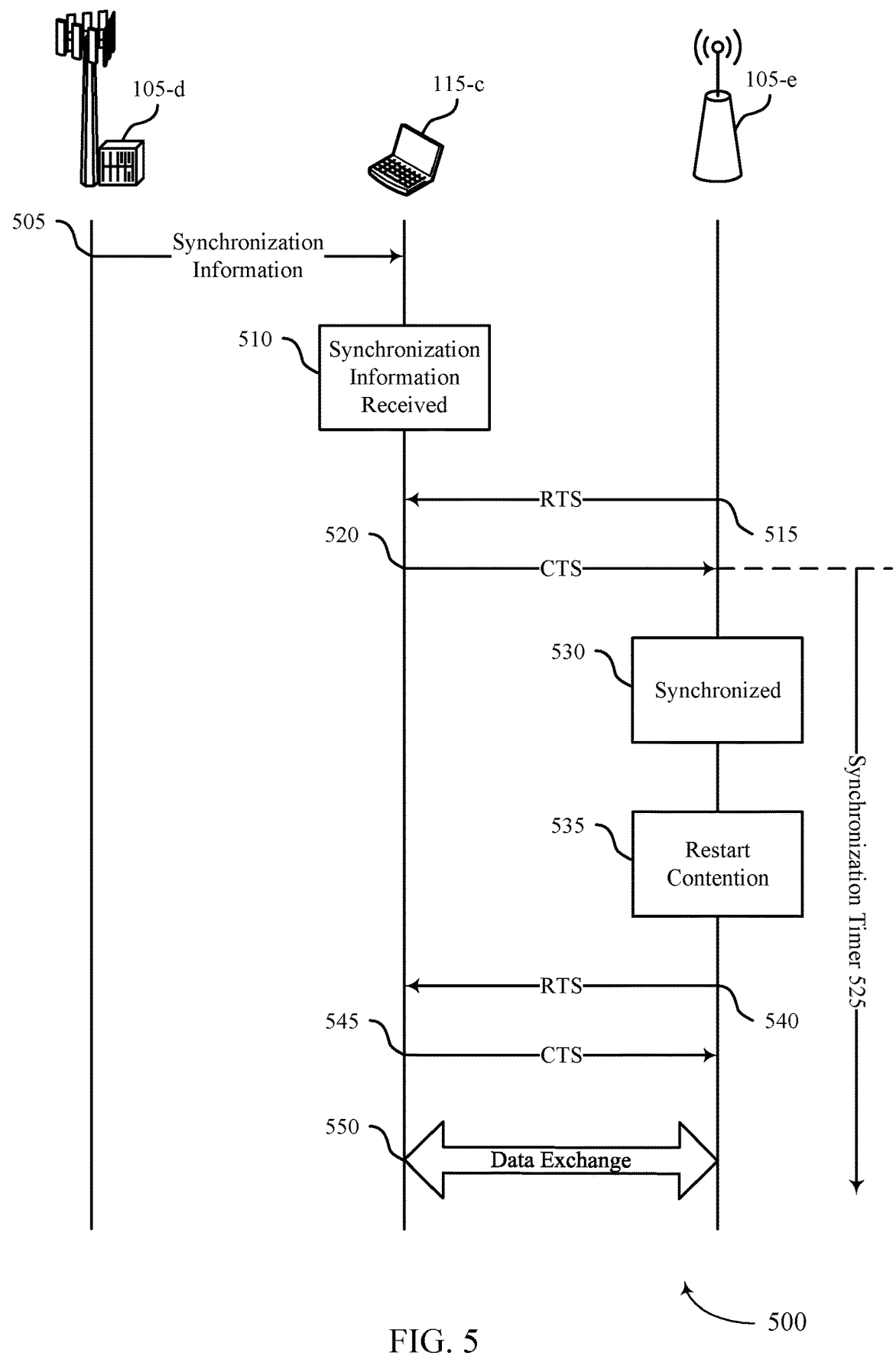

FIG. 5 illustrates an example of a process flow 500 that supports a flexible synchronous and asynchronous access procedure in accordance with aspects of the present disclosure. In some examples, process flow 500 may implement aspects of wireless communications systems 100 and/or 200. Process flow 400 may include a base station 105-d, a STA 115-c, and an AP 105-e, which may be examples of base stations or APs 105 and STAs or UEs 115 as described with reference to FIGS. 1-3. In some cases, base station 105-d may operate synchronously. Additionally or alternatively, STA 115-c and AP 105-e may initially be configured to operate asynchronously. As described herein, AP 105-e may contend for access to a medium to communicate with STA 115-c.

In the following description of the process flow 500, the operations between base station 105-d, STA 115-c, and AP 105-e may be performed in different orders or at different times. Certain operations may also be left out of the process flow 500, or other operations may be added to the process flow 500. It is to be understood that while STA 115-c and AP 105-e are shown performing a number of the operations of process flow 500, any wireless device may perform the operations shown. For example, the operations performed by STA 115-c may be similarly be performed by an AP 105.

Base station 105-d, STA 115-c, and AP 105-e may perform similar steps as described herein with reference to FIG. 4 for 505, 510, 515, 520, 525, and 530 (e.g., the processes performed at 405, 410, 415, 420, 425, and 430 are similar to the processes performed at 505, 510, 515, 520, 525, and 530). However, at 520, AP 105-e may gain the medium but may receive new synchronization information from STA 115-c. For example, the synchronization information may indicate a first priority level of a plurality of different priority levels assigned to AP 105-e.

Accordingly, at 535, based on the new synchronization information, AP 105-e may refrain from transmitting data to STA 115-c, but rather, AP 105-e may start contending for the medium within a synchronization contention window indicated within the new synchronization information. In some cases, AP 105-e may perform, within a first time duration of a plurality of different time durations of a synchronous contention window indicated in the synchronization information corresponding to the first priority level, a second clear channel assessment to contend for access to the shared radio frequency band. For example, AP 105-e may perform the second clear channel assessment in a first half of the synchronous contention window based on the first priority level. Additionally, the first priority level may be based on a QoS level for the data. In some cases, AP 105-e may perform, within a synchronous contention window indicated in the synchronization information, the second clear channel assessment to obtain access to the shared radio frequency band, where data may be communicated based on a result of the second clear channel assessment.

At 540, AP 105-e may transmit a second RTS (e.g., second medium reservation message) including a synchronization indicator indicating the result of the second clear channel assessment to STA 115-c. For example, AP 105-e may perform the second clear channel assessment within the synchronous contention window and determine that the medium is available for communication. In some cases, STA 115-c may monitor for the second RTS during a synchronous contention window indicated in the synchronization information.

At 545, STA 115-c may transmit a second CTS (e.g., second reservation response message) to AP 105-e, where the data may be communicated between AP 105-e and STA 115-c in response to transmitting the second CTS. In some examples, the second CTS may include synchronization information and age information for the synchronization information.

At 550, data may be exchanged between access point 105-e and station 115-c using the shared radio frequency band. Access point 105-e may operate in accordance with the synchronization information until that timer (e.g., synchronization timer 525) expires. The AP 105-e may restart the timer if it receives a subsequent instance of the synchronization information prior to expiration of the timer. If the timer expires without receiving a subsequent instance of the synchronization information, the AP 105-e may have the option to operate using an asynchronous access procedure and may contend for access without regard to a synchronous contention windows.

Figure 6:
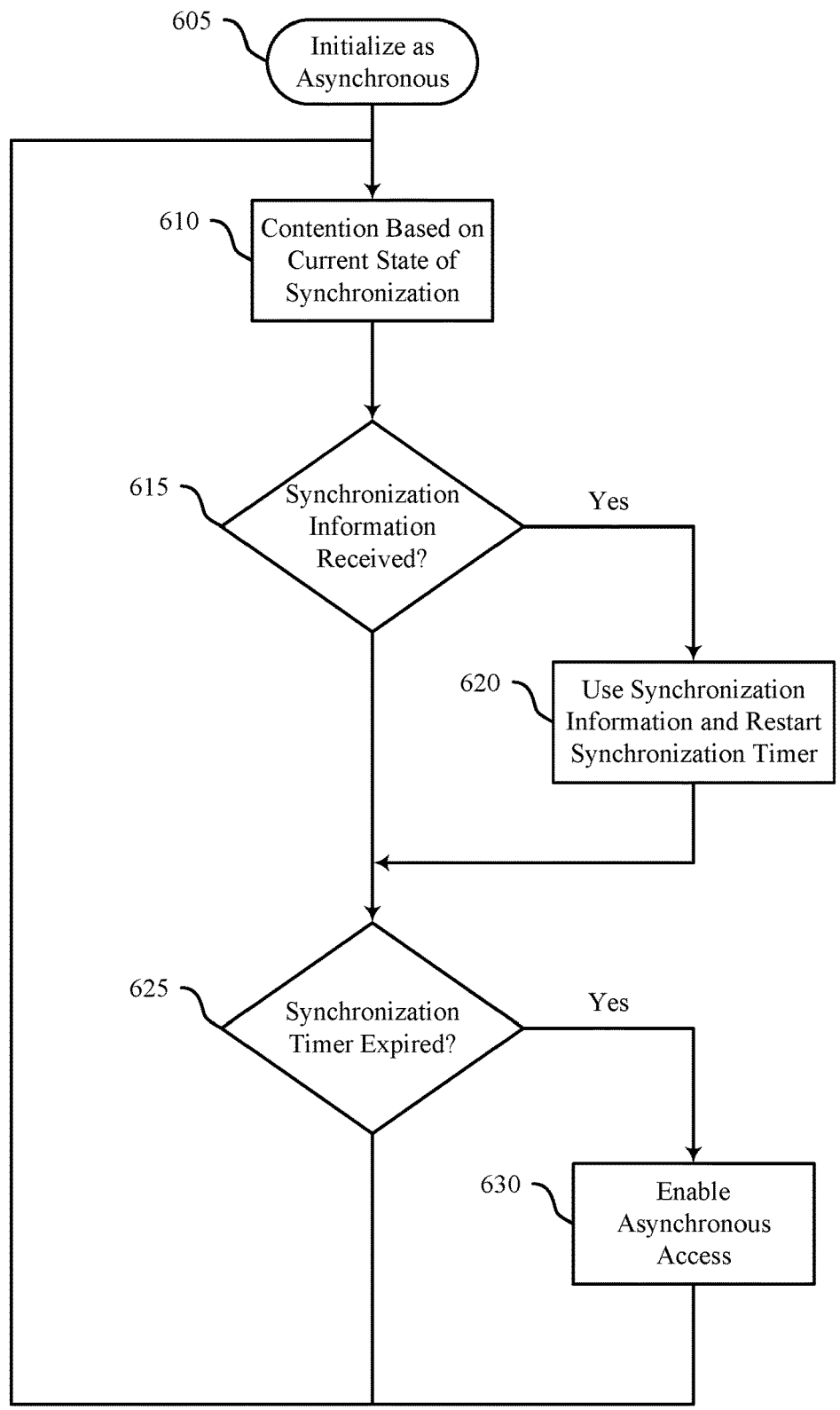
FIG. 6 illustrates an example of a flow diagram that supports flexible synchronous and asynchronous access procedure in accordance with aspects of the present disclosure.

FIG. 6 illustrates an example of a flow diagram 600 that supports a flexible synchronous and asynchronous access procedure in accordance with aspects of the present disclosure. In some examples, flow diagram 600 may implement aspects of wireless communications systems 100 and/or 200. In some cases, a first wireless device (e.g., an asynchronous node) may employ flow diagram 600 based on receiving synchronization messages from a second wireless device and restarting a synchronization timer ($T_s$). For example, an AP 105 may receive synchronization information from a STA 115 and restart the synchronization timer based on receiving the synchronization information.

At 605, the first wireless device may initialize as asynchronous. For example, the first wireless device may transmit data or contend for a medium aperiodically and not wait for predetermined times to communicate with the second wireless device. At 610, the first wireless device may contend for the medium based on the current state of synchronization. If the first wireless device is still operating asynchronously, then the contention for the medium may be performed when data is identified for communications. If the first wireless device receives synchronization information from the second wireless device, as described herein, then the contention for the medium may be performed during a predetermined synchronous contention window. At 615, the first wireless device may receive synchronization information. For example, the second wireless device may transmit the synchronization information to the first wireless device as part of a reservation response message (e.g., CTS message) after receiving a medium reservation request message (e.g., RTS message) from the first wireless device.

If the synchronization information is received, at 620, the first wireless device may use the synchronization information for subsequent data communications and start or restart the synchronization timer. For example, if this instance of the synchronization information is the first time the first wireless device receives synchronization information from the second wireless device, then the first wireless device may initiate and start the synchronization timer for the first time. If the first wireless device has previously received synchronization information before this instance of the synchronization information, then the first wireless device may restart the synchronization timer and continue synchronous operations. At 625, the first wireless device may determine if the synchronization timer expires. If the synchronization timer has expired, at 630, the first wireless device may enable an asynchronous medium access procedure. Additionally or alternatively, if the synchronization timer has not expired, then the first wireless device may contend for the medium again and restart the process. However, as described herein, the first wireless device may have received the synchronization information at 615, and, as such, the first wireless device may be synchronized and perform the medium contention process synchronously.

Figure 7:
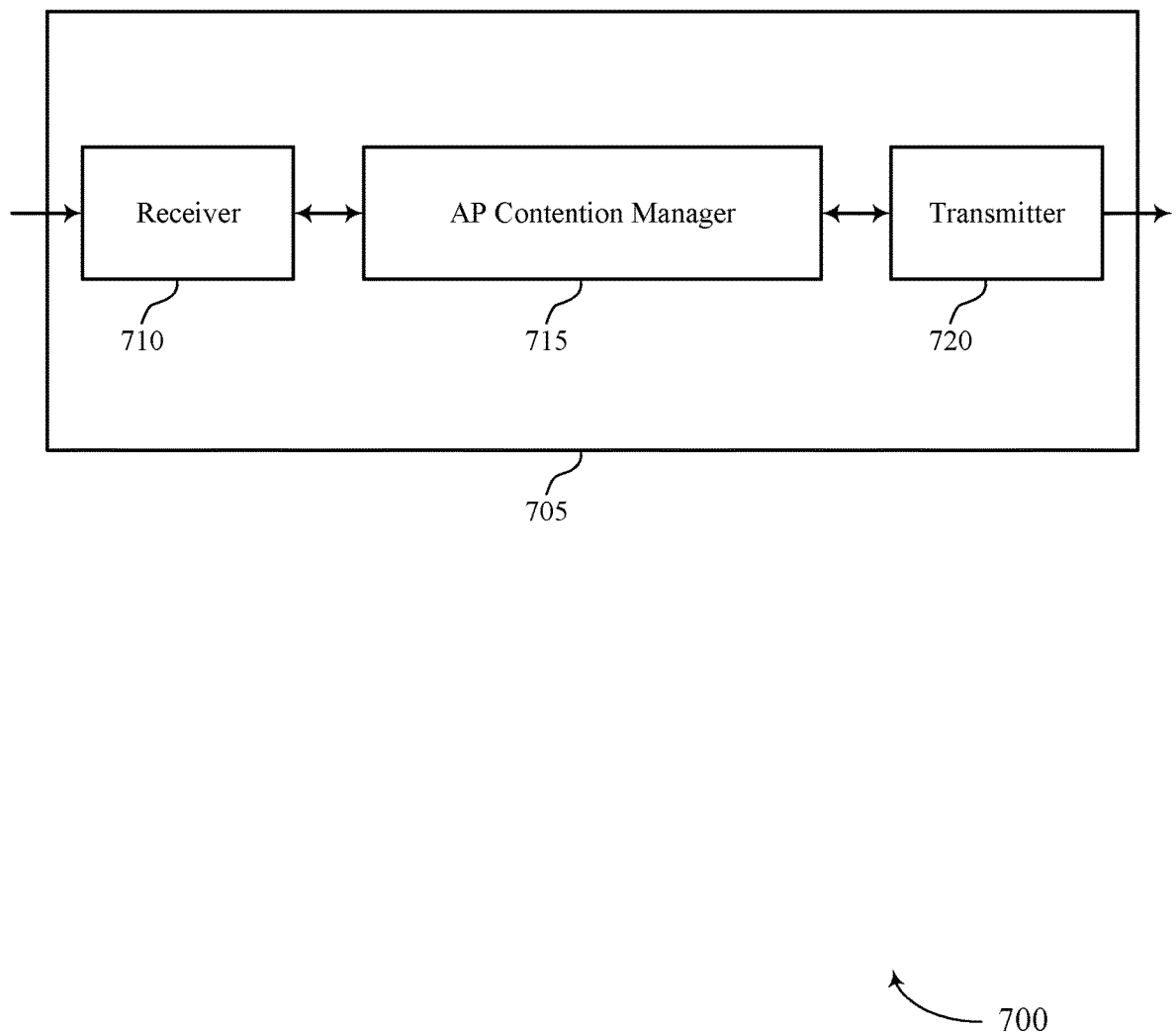
FIGS. 7 and 8 show block diagrams of devices that support flexible synchronous and asynchronous access procedure in accordance with aspects of the present disclosure.

FIG. 7 shows a block diagram 700 of a device 705 that supports flexible synchronous and asynchronous access procedure in accordance with aspects of the present disclosure. The device 705 may be an example of aspects of an AP as described herein. The device 705 may include a receiver 710, an AP contention manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to flexible synchronous and asynchronous access procedure, etc.). Information may be passed on to other components of the device. The receiver 710 may be an example of aspects of the transceiver 1020 described with reference to FIG. 10. The receiver 710 may utilize a single antenna or a set of antennas.

The AP contention manager 715 may perform an asynchronous clear channel assessment to obtain access to a shared radio frequency band. In some cases, the AP contention manager 715 may receive, via the shared radio frequency band, a medium reservation message from a second wireless device indicating synchronization information for a synchronous contention window. Additionally, the AP contention manager 715 may perform a second clear channel assessment within the synchronous contention window to obtain access to the shared radio frequency band. Accordingly, the AP contention manager 715 may communicate, via the shared radio frequency band, data in accordance with the synchronization information based on the second clear channel assessment.

The AP contention manager 715 as described herein may be implemented to realize one or more potential advantages. One implementation may allow the device 705 to provide techniques which may support flexible synchronous and asynchronous access procedure, among other advantages. For example, the device 705 may include features for improved QoS for a wireless system and wireless devices operating therein, as the device 705 may obtain access to a shared radio frequency band based on clear channel assessments and a medium reservation message indicating synchronization information for a synchronous contention window. Additionally or alternatively, the device 705 may include features for synchronization among the wireless devices in the wireless system, as the device 705 may provide synchronization information inclusive of age information, which one or more nodes in a series of nodes may use to continuously maintain a reference system time. The AP contention manager 715 may be an example of aspects of the AP contention manager 1010 described herein.

The AP contention manager 715, or its sub-components, may be implemented in hardware, code (e.g., software or firmware) executed by a processor, or any combination thereof. If implemented in code executed by a processor, the functions of the AP contention manager 715, or its sub-components may be executed by a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described in the present disclosure.

The AP contention manager 715, or its sub-components, may be physically located at various positions, including being distributed such that portions of functions are implemented at different physical locations by one or more physical components. In some examples, the AP contention manager 715, or its sub-components, may be a separate and distinct component in accordance with various aspects of the present disclosure. In some examples, the AP contention manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
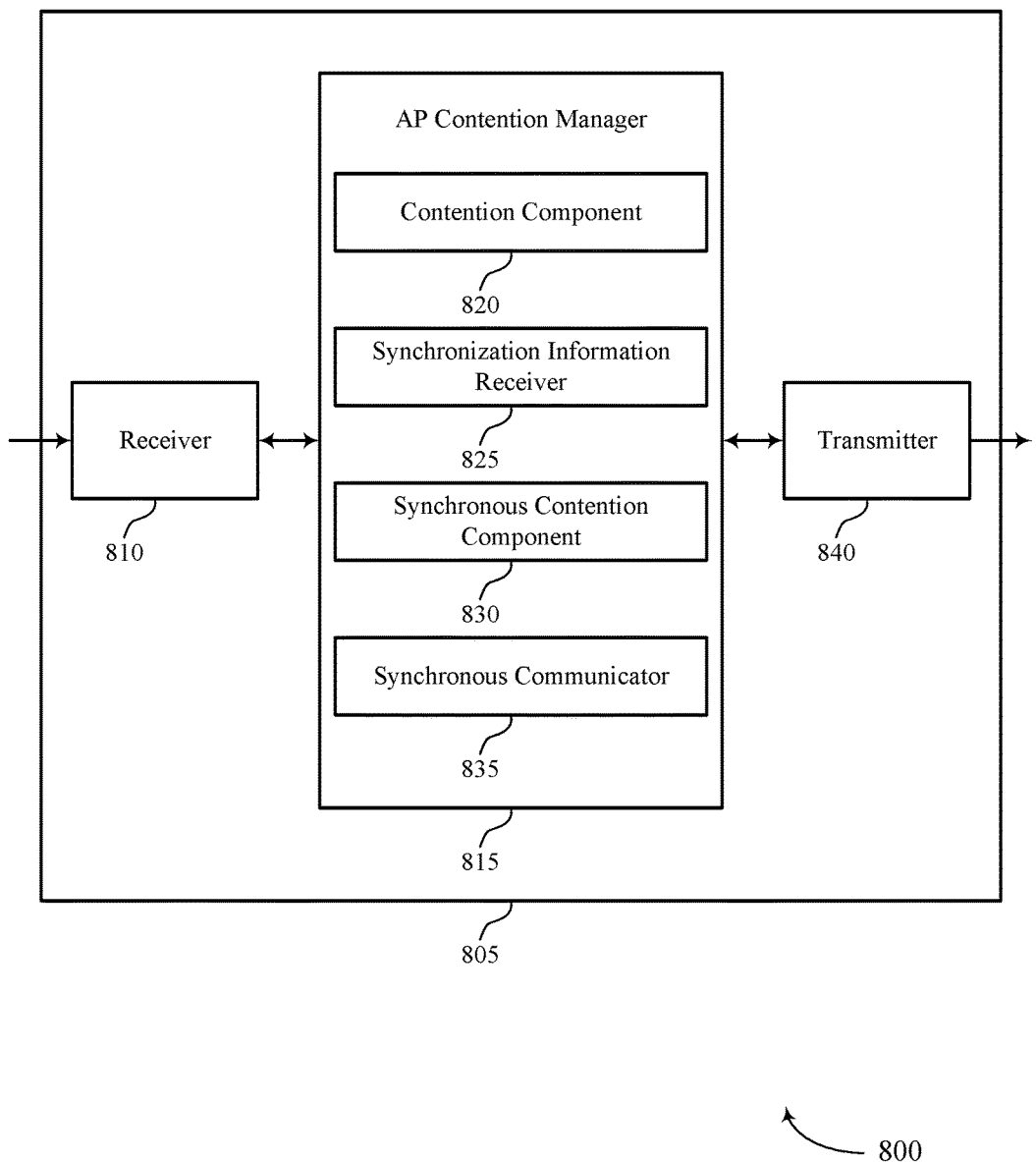

FIG. 8 shows a block diagram 800 of a device 805 that supports flexible synchronous and asynchronous access procedure in accordance with aspects of the present disclosure. The device 805 may be an example of aspects of a device 705 or an AP 105 as described herein. The device 805 may include a receiver 810, an AP contention manager 815, and a transmitter 840. The device 805 may also include a processor. Each of these components may be in communication with one another (e.g., via one or more buses).

The receiver 810 may receive information such as packets, user data, or control information associated with various information channels (e.g., control channels, data channels, and information related to flexible synchronous and asynchronous access procedure, etc.). Information may be passed on to other components of the device. The receiver 810 may be an example of aspects of the transceiver 1020 described with reference to FIG. 10. The receiver 810 may utilize a single antenna or a set of antennas.

The AP contention manager 815 may be an example of aspects of the AP contention manager 715 as described herein. The AP contention manager 815 may include a contention component 820, a synchronization information receiver 825, a synchronous contention component 830, and a synchronous communicator 835. The AP contention manager 815 may be an example of aspects of the AP contention manager 1010 described herein.

The contention component 820 may perform an asynchronous clear channel assessment to obtain access to a shared radio frequency band.

The synchronization information receiver 825 may receive, via the shared radio frequency band, a medium reservation message from a second wireless device indicating synchronization information for a synchronous contention window.

The synchronous contention component 830 may perform a second clear channel assessment within the synchronous contention window to obtain access to the shared radio frequency band.

The synchronous communicator 835 may communicate, via the shared radio frequency band, data in accordance with the synchronization information based on the second clear channel assessment.

The transmitter 840 may transmit signals generated by other components of the device. In some examples, the transmitter 840 may be collocated with a receiver 810 in a transceiver module. For example, the transmitter 840 may be an example of aspects of the transceiver 1020 described with reference to FIG. 10. The transmitter 840 may utilize a single antenna or a set of antennas.

Figure 9:
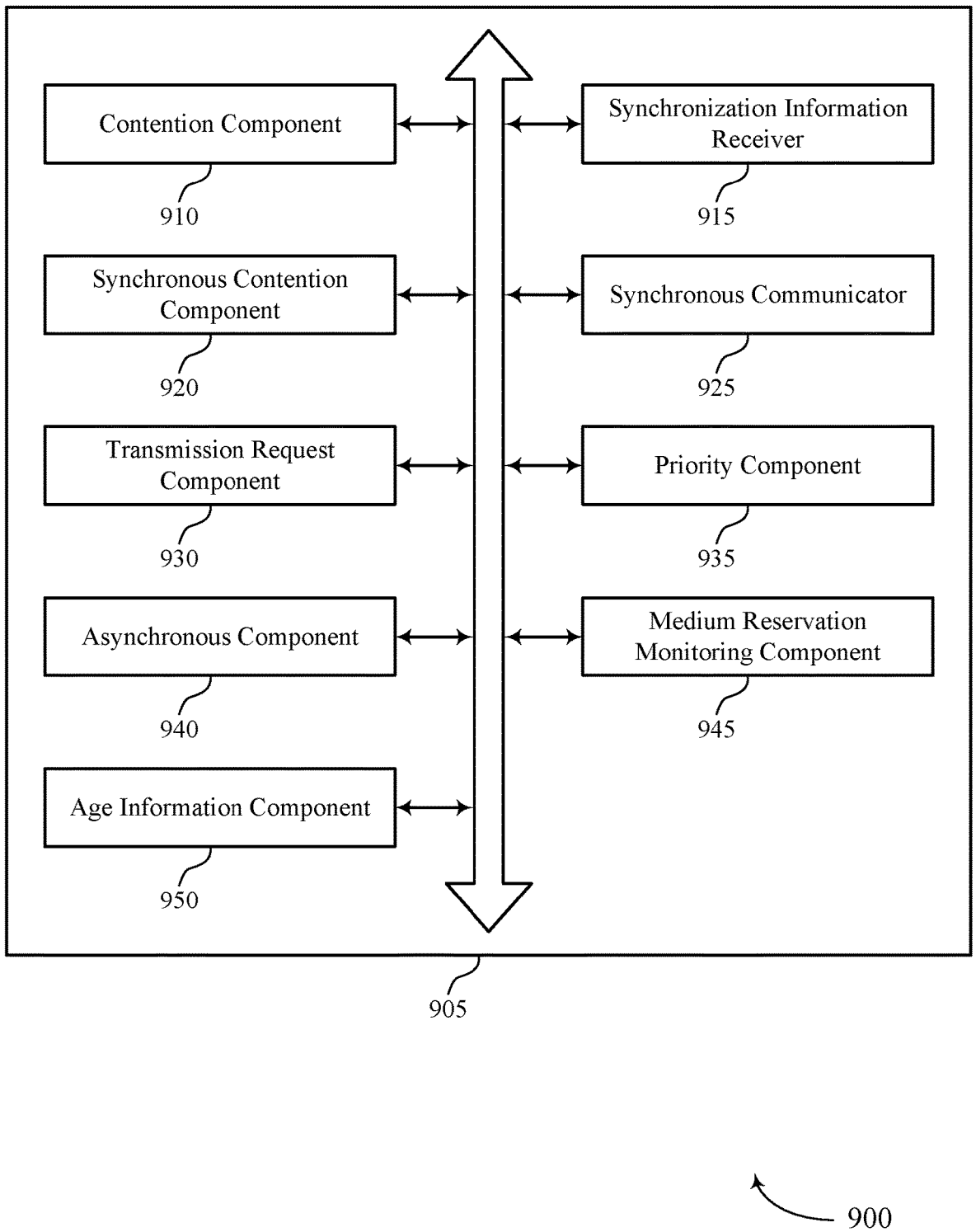
FIG. 9 shows a block diagram of an AP contention manager that supports flexible synchronous and asynchronous access procedure in accordance with aspects of the present disclosure.

FIG. 9 shows a block diagram 900 of an AP contention manager 905 that supports flexible synchronous and asynchronous access procedure in accordance with aspects of the present disclosure. The AP contention manager 905 may be an example of aspects of an AP contention manager 715, an AP contention manager 815, or an AP contention manager 1010 described herein. The AP contention manager 905 may include a contention component 910, a synchronization information receiver 915, a synchronous contention component 920, a synchronous communicator 925, a transmission request component 930, a priority component 935, an asynchronous component 940, a medium reservation monitoring component 945, and an age information component 950. Each of these modules may communicate, directly or indirectly, with one another (e.g., via one or more buses).

The contention component 910 may perform an asynchronous clear channel assessment to obtain access to a shared radio frequency band.

The synchronization information receiver 915 may receive, via the shared radio frequency band, a medium reservation message from a second wireless device indicating synchronization information for a synchronous contention window. In some cases, the synchronization information may configure the first wireless device with the synchronous contention window in which to contend for access to the shared radio frequency band. Additionally, the synchronization information may indicate a duration of a channel occupancy time, a duration of the synchronous contention window, a duration in which the first wireless device is to maintain synchronization, or any combination thereof.

In some cases, the synchronization information may indicate a first synchronization configuration of a set of synchronization configurations. Accordingly, each synchronization configuration of the set of synchronization configurations has a different duration for a channel occupancy time, a different number of synchronous contention windows, or both.

In some cases, the synchronization information may configure the first wireless device to transmit the synchronization information one or more times within a defined duration of time. Additionally or alternatively, the synchronization information may configure the first wireless device to maintain synchronization within a defined duration of time.

In some cases, the synchronization information may include a bit indicating whether a receipt time of the medium reservation message indicates a boundary between the synchronous contention window and a channel occupancy time. Additionally, the synchronization information may include a bit indicating that the second wireless device is synchronized within a time window for which the second wireless device is capable of maintaining synchronization within a defined tolerance.

The synchronous contention component 920 may perform a second clear channel assessment within the synchronous contention window to obtain access to the shared radio frequency band. In some examples, the synchronous contention component 920 may transmit a second medium reservation message including a synchronization indicator indicating the result of the second clear channel assessment, where the data is communicated with the second wireless device or a third wireless device based on the second medium reservation message.

The synchronous communicator 925 may communicate, via the shared radio frequency band, data in accordance with the synchronization information based on the second clear channel assessment. In some examples, the synchronous communicator 925 may communicate the data to the second wireless device or a third wireless device beginning at a boundary between the synchronous contention window and a channel occupancy time, where the synchronization information indicates the boundary. Additionally or alternatively, the synchronous communicator 925 may communicate the data within a duration of a channel occupancy time indicated in the synchronization information. In some cases, the synchronization information includes a time shift relative to a synchronized clock time for indicating the boundary.

The transmission request component 930 may transmit, based on the asynchronous clear channel assessment, a transmission request message via the shared radio frequency band, where the medium reservation message is received in response to the transmission request message.

The priority component 935 may perform, within a first time duration of a set of different time durations of the synchronous contention window corresponding to the first priority level, the second clear channel assessment to contend for access to the shared radio frequency band. In some cases, the first priority level is based on a quality of service level for the data.

The asynchronous component 940 may operate in an asynchronous mode based on determining that synchronization information has not been received within the duration of time.

The medium reservation monitoring component 945 may monitor for a second medium reservation message during the synchronous contention window indicated in the synchronization information.

The age information component 950 may communicate the data in accordance with the synchronization information based on the age information satisfying a threshold value. Additionally or alternatively, the age information component 950 may add a time offset to the age information to generate updated age information based on determining that the first wireless device is not capable of maintaining synchronization for a defined duration of time. Accordingly, the age information component 950 may then transmit the synchronization information and the updated age information to a third wireless device.

Figure 10:
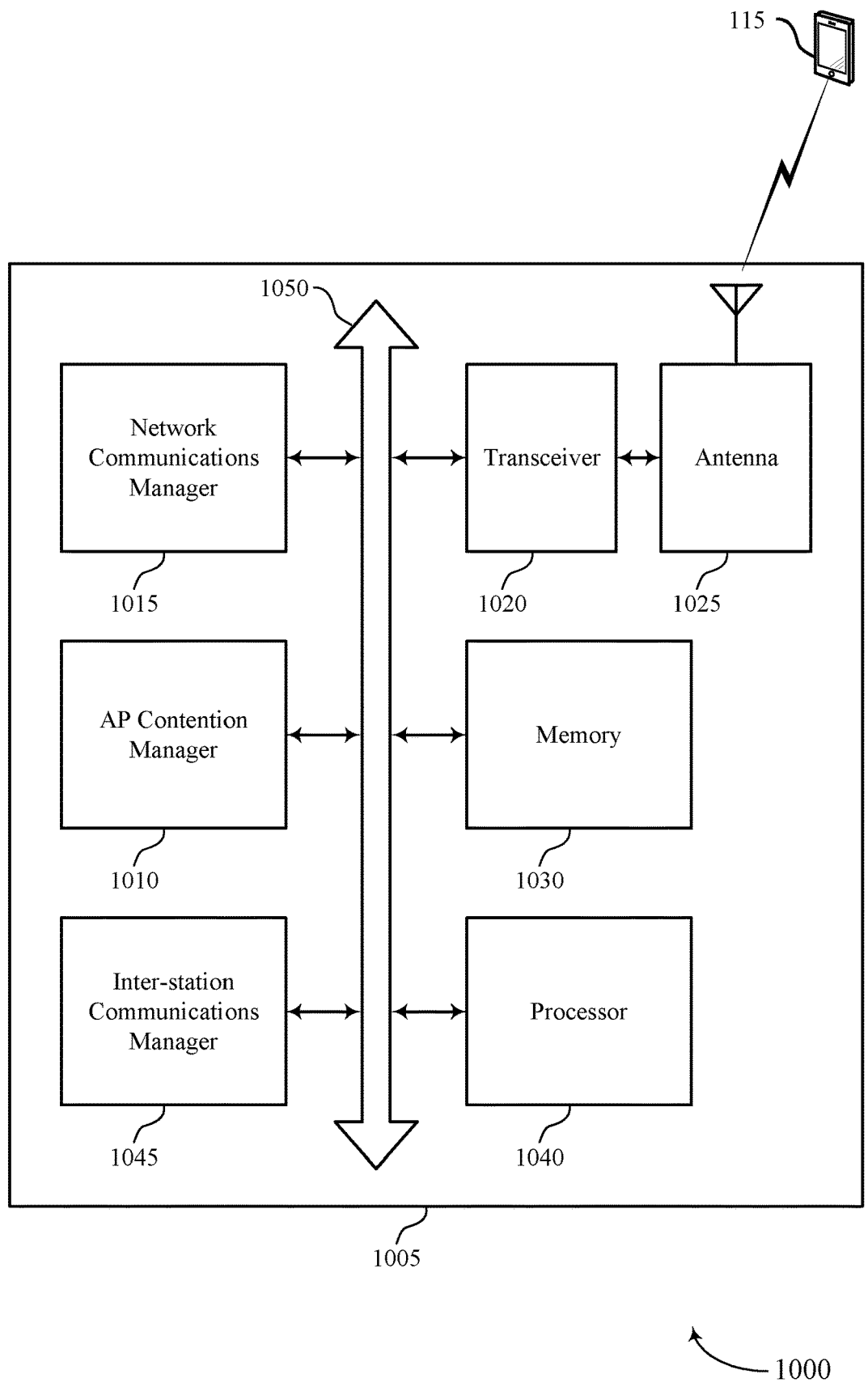
FIG. 10 shows a diagram of a system including a device that supports flexible synchronous and asynchronous access procedure in accordance with aspects of the present disclosure.

FIG. 10 shows a diagram of a system 1000 including a device 1005 that supports flexible synchronous and asynchronous access procedure in accordance with aspects of the present disclosure. The device 1005 may be an example of or include the components of device 705, device 805, or an AP as described herein. The device 1005 may include components for bi-directional voice and data communications including components for transmitting and receiving communications, including an AP contention manager 1010, a network communications manager 1015, a transceiver 1020, an antenna 1025, memory 1030, a processor 1040, and an inter-station communications manager 1045. These components may be in electronic communication via one or more buses (e.g., bus 1050).

The AP contention manager 1010 may perform an asynchronous clear channel assessment to obtain access to a shared radio frequency band. In some cases, the AP contention manager 1010 may receive, via the shared radio frequency band, a medium reservation message from a second wireless device indicating synchronization information for a synchronous contention window. Additionally, the AP contention manager 1010 may perform a second clear channel assessment within the synchronous contention window to obtain access to the shared radio frequency band. Accordingly, the AP contention manager 1010 may communicate, via the shared radio frequency band, data in accordance with the synchronization information based on the second clear channel assessment.

The network communications manager 1015 may manage communications with the core network (e.g., via one or more wired backhaul links). For example, the network communications manager 1015 may manage the transfer of data communications for client devices, such as one or more UEs 115.

The transceiver 1020 may communicate bi-directionally, via one or more antennas, wired, or wireless links as described herein. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include random-access memory (RAM) and read-only memory (ROM). The memory 1030 may store computer-readable, computer-executable code 10 35 including instructions that, when executed, cause the processor to perform various functions described herein. In some cases, the memory 1030 may contain, among other things, a basic I/O system (BIOS) which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a PLD, a discrete gate or transistor logic component, a discrete hardware component, or any combination thereof). In some cases, the processor 1040 may be configured to operate a memory array using a memory controller. In other cases, a memory controller may be integrated into processor 1040. The processor 1040 may be configured to execute computer-readable instructions stored in a memory to perform various functions (e.g., functions or tasks supporting flexible synchronous and asynchronous access procedure).

The inter-station communications manager 1045 may manage communications with other base station 105, and may include a controller or scheduler for controlling communications with UEs 115 in cooperation with other base stations 105. For example, the inter-station communications manager 1045 may coordinate scheduling for transmissions to UEs 115 for various interference mitigation techniques such as beamforming or joint transmission. In some examples, the inter-station communications manager 1045 may provide an X2 interface within an LTE/LTE-A wireless communication network technology to provide communication between base stations 105.

Figure 11:
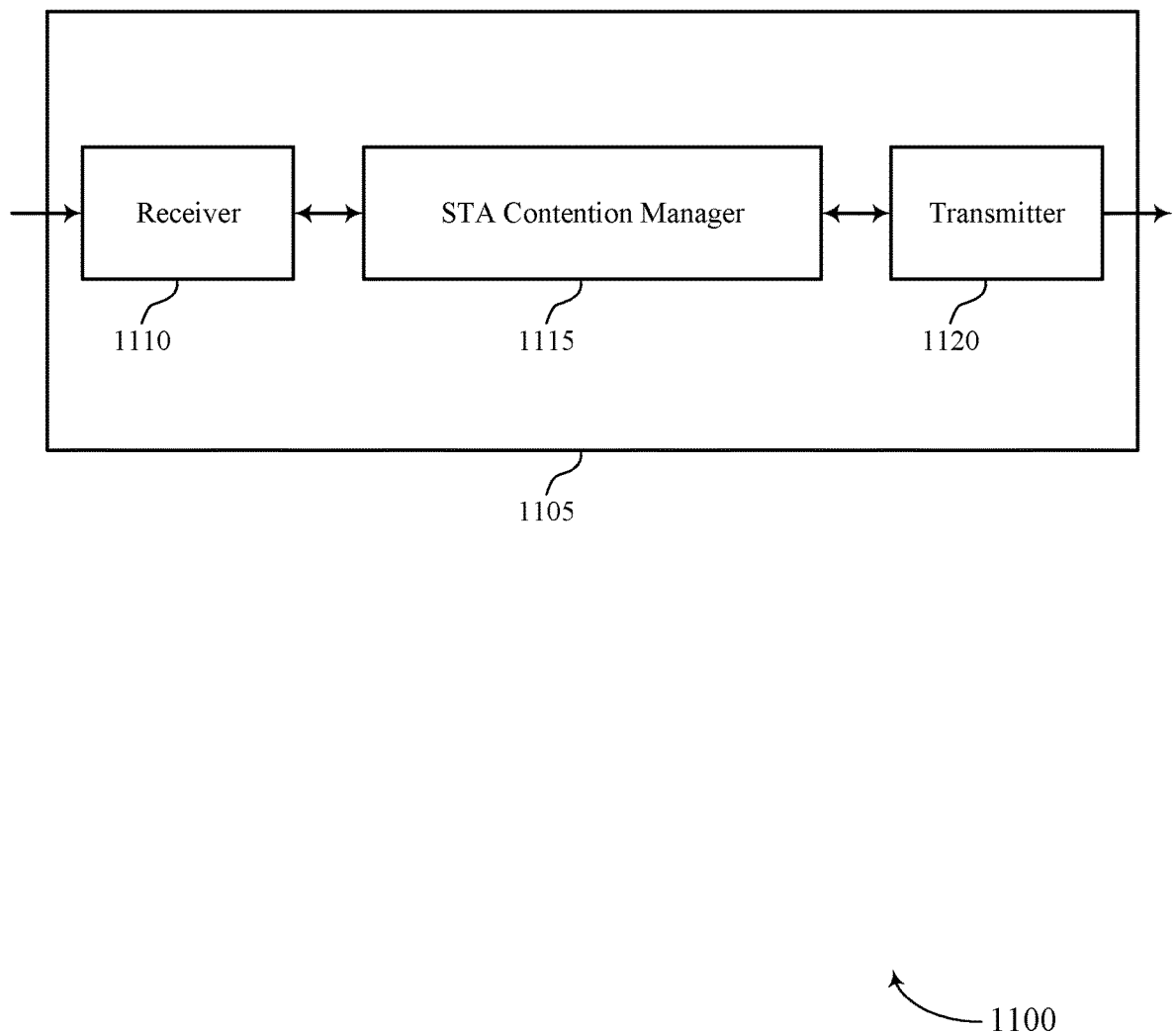
FIGS. 11 and 12 show block diagrams of devices that support flexible synchronous and asynchronous access procedure in accordance with aspects of the present disclosure.

FIG. 11 shows a block diagram 1100 of a device 1105 that supports flexible synchronous and asynchronous access procedure in accordance with aspects of the present disclosure. The device 1105 may be an example of aspects of a STA as described herein. The device 1105 may include a receiver 1110, a STA contention manager 1115, and a transmitter 1120. The device 1105 may also include a processor. Each of these components may be in communication with one another (e.g., via one or more buses).

Receiver 1110 may receive information such as packets, user data, or control information associated with various information channels (e.g., control channels, data channels, and information related to flexible synchronous and asynchronous access procedure, etc.). Information may be passed on to other components of the device. The receiver 1110 may be an example of aspects of the transceiver 1420 described with reference to FIG. 14. The receiver 1110 may utilize a single antenna or a set of antennas.

The STA contention manager 1115 may receive a medium reservation message from a second wireless device via a shared radio frequency band. Additionally, the STA contention manager 1115 may transmit, via the shared radio frequency band, a medium reservation response message indicating synchronization information for a synchronous contention window. Accordingly, the STA contention manager 1115 may communicate, via the shared radio frequency band, data in accordance with the synchronization information.

The STA contention manager 1115 as described herein may be implemented to realize one or more potential advantages. One implementation may allow the device 1105 to provide techniques which may support flexible synchronous and asynchronous access procedure, among other advantages. For example, the device 1105 may include features for improved QoS for a wireless system and wireless devices operating therein, as the device 1105 may transmit, based on received medium reservation message, a medium reservation response message indicating synchronization information for a synchronous contention window associated with a shared radio frequency band. Additionally or alternatively, the device 1105 may include features for synchronization among the wireless devices in the wireless system, as the device 1105 may provide synchronization information inclusive of age information, which one or more nodes in a series of nodes may use to continuously maintain a reference system time. The STA contention manager 1115 may be an example of aspects of the STA contention manager 1410 described herein.

The STA contention manager 1115, or its sub-components, may be implemented in hardware, code (e.g., software or firmware) executed by a processor, or any combination thereof. If implemented in code executed by a processor, the functions of the STA contention manager 1115, or its sub-components may be executed by a general-purpose processor, a DSP, an ASIC, an FPGA or other PLD, discrete gate or transistor logic, discrete hardware components, or any combination thereof designed to perform the functions described in the present disclosure.

The STA contention manager 1115, or its sub-components, may be physically located at various positions, including being distributed such that portions of functions are implemented at different physical locations by one or more physical components. In some examples, the STA contention manager 1115, or its sub-components, may be a separate and distinct component in accordance with various aspects of the present disclosure. In some examples, the STA contention manager 1115, or its sub-components, may be combined with one or more other hardware components, including but not limited to an I/O component, a transceiver, a network server, another computing device, one or more other components described in the present disclosure, or a combination thereof in accordance with various aspects of the present disclosure.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
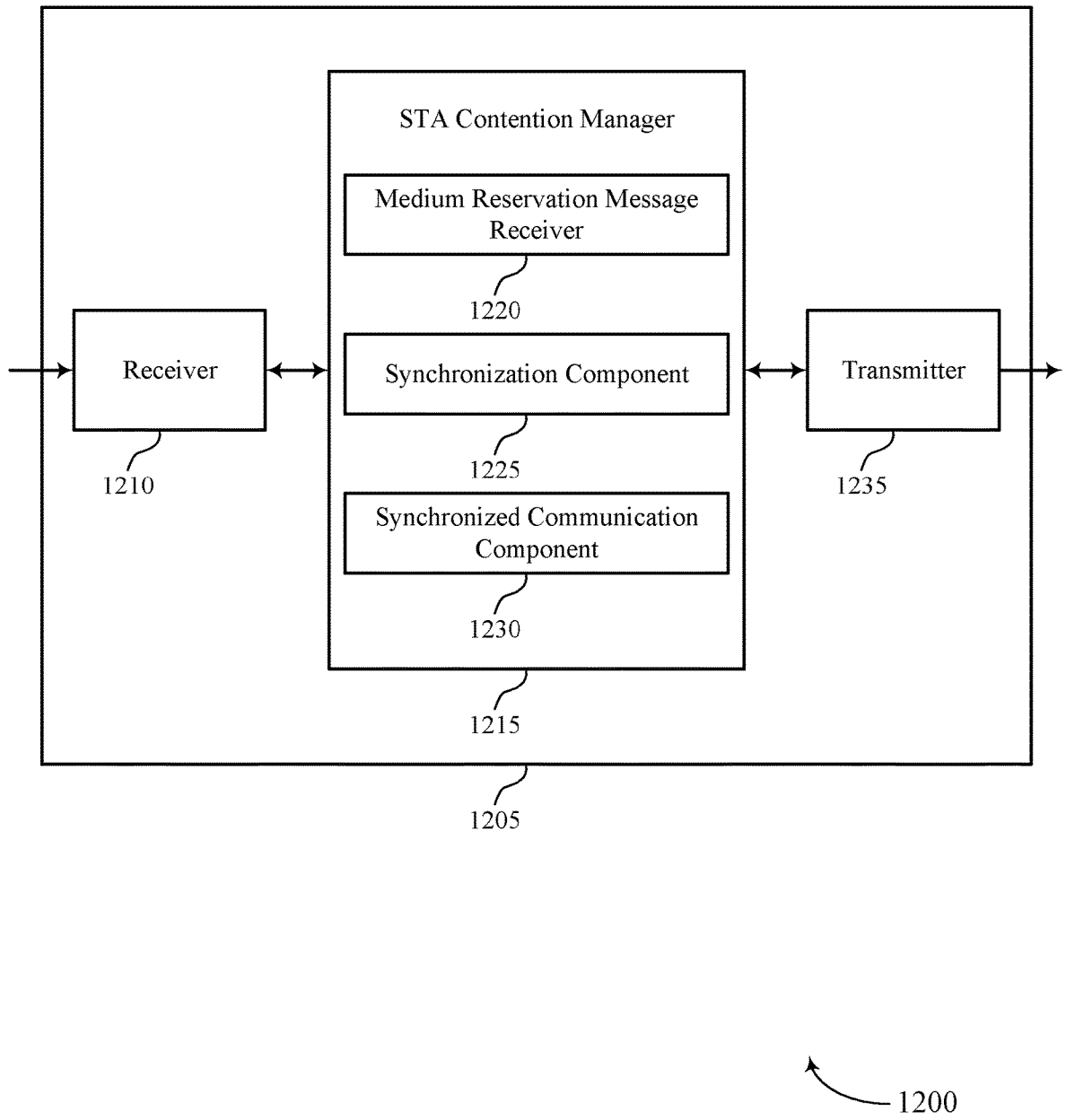

FIG. 12 shows a block diagram 1200 of a device 1205 that supports flexible synchronous and asynchronous access procedure in accordance with aspects of the present disclosure. The device 1205 may be an example of aspects of a device 1105 or a STA 115 as described herein. The device 1205 may include a receiver 1210, a STA contention manager 1215, and a transmitter 1235. The device 1205 may also include a processor. Each of these components may be in communication with one another (e.g., via one or more buses).

Receiver 1210 may receive information such as packets, user data, or control information associated with various information channels (e.g., control channels, data channels, and information related to flexible synchronous and asynchronous access procedure, etc.). Information may be passed on to other components of the device. The receiver 1210 may be an example of aspects of the transceiver 1420 described with reference to FIG. 14. The receiver 1210 may utilize a single antenna or a set of antennas.

The STA contention manager 1215 may be an example of aspects of the STA contention manager 1115 as described herein. The STA contention manager 1215 may include a medium reservation message receiver 1220, a synchronization component 1225, and a synchronized communication component 1230. The STA contention manager 1215 may be an example of aspects of the STA contention manager 1410 described herein.

The medium reservation message receiver 1220 may receive a medium reservation message from a second wireless device via a shared radio frequency band.

The synchronization component 1225 may transmit, via the shared radio frequency band, a medium reservation response message indicating synchronization information for a synchronous contention window.

The synchronized communication component 1230 may communicate, via the shared radio frequency band, data in accordance with the synchronization information.

Transmitter 1235 may transmit signals generated by other components of the device. In some examples, the transmitter 1235 may be collocated with a receiver 1210 in a transceiver module. For example, the transmitter 1235 may be an example of aspects of the transceiver 1420 described with reference to FIG. 14. The transmitter 1235 may utilize a single antenna or a set of antennas.

Figure 13:
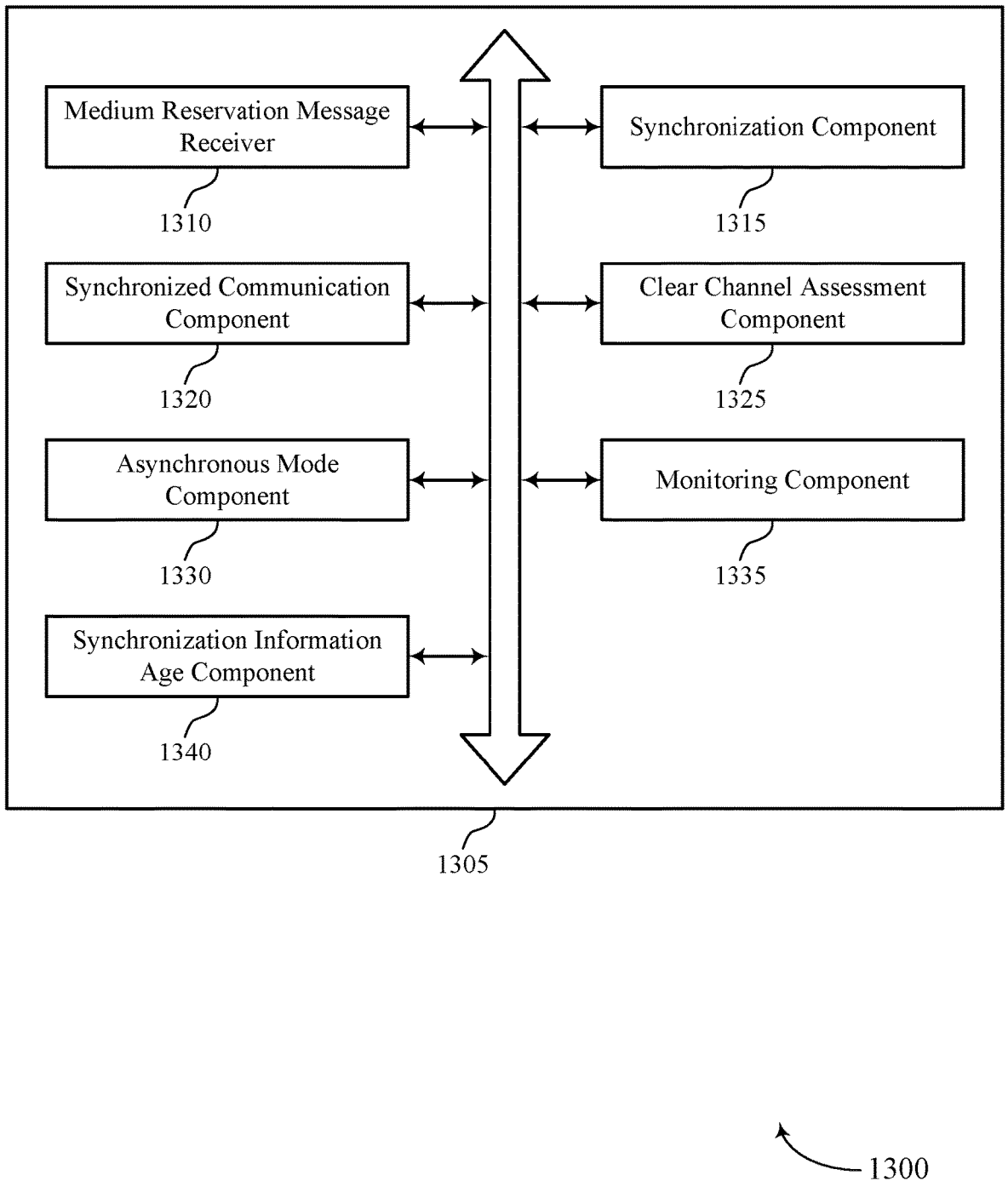
FIG. 13 shows a block diagram of a STA contention manager that supports flexible synchronous and asynchronous access procedure in accordance with aspects of the present disclosure.

FIG. 13 shows a block diagram 1300 of a STA contention manager 1305 that supports flexible synchronous and asynchronous access procedure in accordance with aspects of the present disclosure. The STA contention manager 1305 may be an example of aspects of a STA contention manager 1115, a STA contention manager 1215, or a STA contention manager 1410 described herein. The STA contention manager 1305 may include a medium reservation message receiver 1310, a synchronization component 1315, a synchronized communication component 1320, a clear channel assessment component 1325, an asynchronous mode component 1330, a monitoring component 1335, and a synchronization information age component 1340. Each of these modules may communicate, directly or indirectly, with one another (e.g., via one or more buses).

The medium reservation message receiver 1310 may receive a medium reservation message from a second wireless device via a shared radio frequency band.

The synchronization component 1315 may transmit, via the shared radio frequency band, a medium reservation response message indicating synchronization information for a synchronous contention window. In some cases, the synchronization information may configure the second wireless device with the synchronous contention window in which to contend for access to the shared radio frequency band. Additionally, the synchronization information may indicate a duration of a channel occupancy time, a duration of the synchronous contention window, a duration in which the second wireless device is to maintain synchronization with the first wireless device, or any combination thereof.

In some cases, the synchronization information may indicate a first priority level of a set of different priority levels assigned to the first wireless device and a first time duration of a set of different time durations of the synchronous contention window corresponding to the first priority level. In some cases, the first priority level may be based on a quality of service level for the data.

Additionally or alternatively, the synchronization information may indicate a first synchronization configuration of a set of synchronization configurations. Accordingly, each synchronization configuration of the set of synchronization configurations may have a different duration for a channel occupancy time, a different number of synchronous contention windows, or both.

In some cases, the synchronization information may configure the second wireless device to transmit the synchronization information one or more times within a defined duration of time. Additionally or alternatively, the synchronization information may configure the second wireless device to maintain synchronization within a defined duration of time.

In some cases, the synchronization information may include a bit indicating whether a receipt time of the medium reservation response message indicates a boundary between the synchronous contention window and a channel occupancy time. Additionally, the synchronization information may include a bit indicating that the first wireless device is synchronized within a time window for which the first wireless device is capable of maintaining synchronization within a defined tolerance.

The synchronized communication component 1320 may communicate, via the shared radio frequency band, data in accordance with the synchronization information. In some examples, the synchronized communication component 1320 may communicate the data to the second wireless device or a third wireless device beginning at a boundary between the synchronous contention window and a channel occupancy time, where the synchronization information indicates the boundary. Additionally or alternatively, the synchronized communication component 1320 may communicate the data with the second wireless device or a third wireless device within a duration of a channel occupancy time indicated in the synchronization information. In some cases, the synchronization information includes a time shift relative to a synchronized clock time for indicating the boundary.

The clear channel assessment component 1325 may receive a second medium reservation message including a synchronization indicator indicating the result of a second clear channel assessment. In some examples, the clear channel assessment component 1325 may transmit a second medium reservation response message, where the data is communicated in response to receiving the second medium reservation message.

The asynchronous mode component 1330 may operate in an asynchronous mode based on determining that second synchronization information has not been received within the duration of time.

The monitoring component 1335 may monitor for a second medium reservation message during the synchronous contention window indicated in the synchronization information.

The synchronization information age component 1340 may add a time offset to the age information to generate updated age information based on determining that the first wireless device is not capable of maintaining synchronization for a defined duration of time. Accordingly, the synchronization information age component 1340 may transmit the synchronization information and the updated age information to a third wireless device. In some cases, the medium reservation response message includes age information for the synchronization information.

Figure 14:
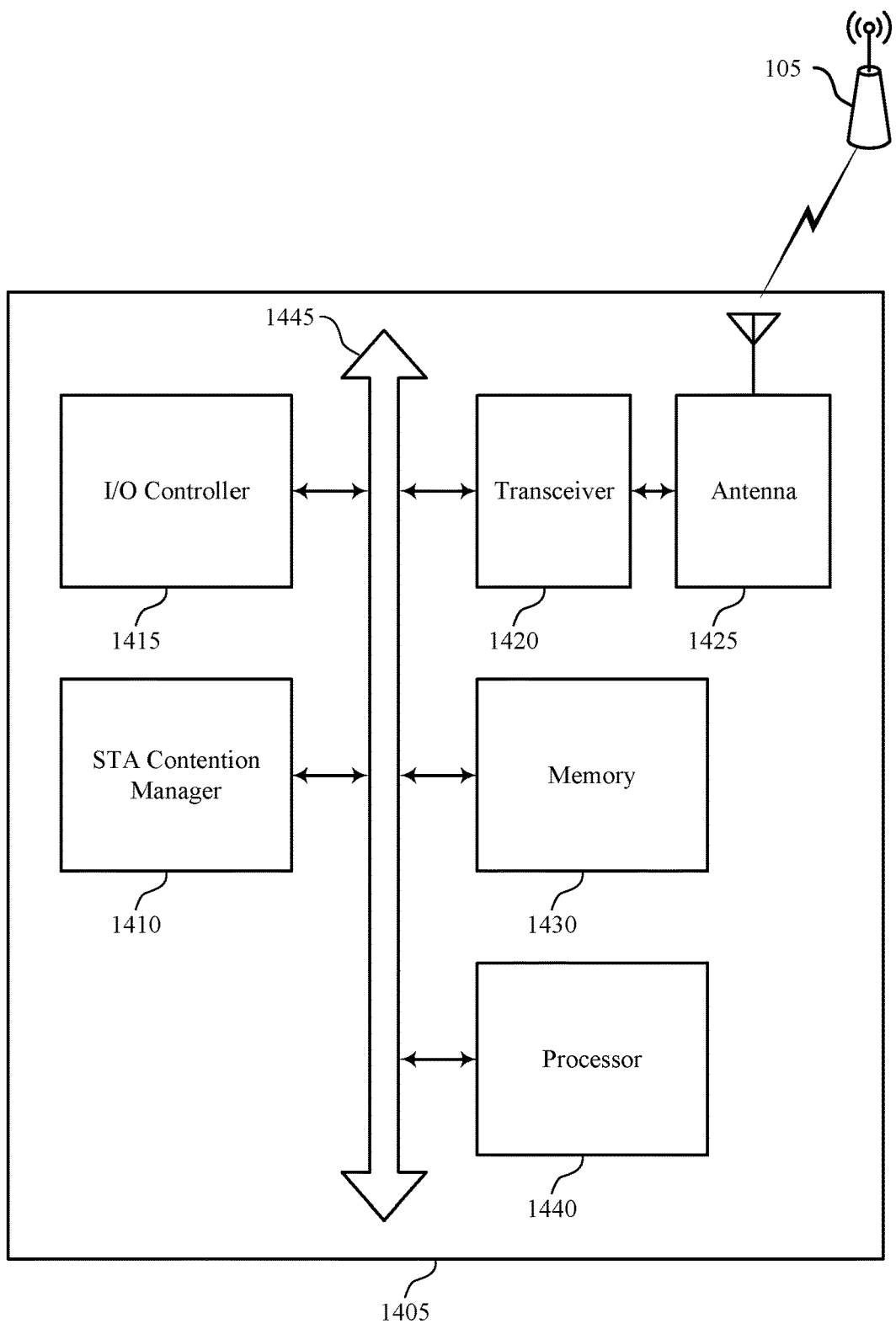
FIG. 14 shows a diagram of a system including a device that supports flexible synchronous and asynchronous access procedure in accordance with aspects of the present disclosure.

FIG. 14 shows a diagram of a system 1400 including a device 1405 that supports flexible synchronous and asynchronous access procedure in accordance with aspects of the present disclosure. The device 1405 may be an example of or include the components of device 1105, device 1205, or a STA as described herein. The device 1405 may include components for bi-directional voice and data communications including components for transmitting and receiving communications, including a STA contention manager 1410, an I/O controller 1415, a transceiver 1420, an antenna 1425, memory 1430, and a processor 1440. These components may be in electronic communication via one or more buses (e.g., bus 1445).

The STA contention manager 1410 may receive a medium reservation message from a second wireless device via a shared radio frequency band. Additionally, the STA contention manager 1410 may transmit, via the shared radio frequency band, a medium reservation response message indicating synchronization information for a synchronous contention window. Accordingly, the STA contention manager 1410 may communicate, via the shared radio frequency band, data in accordance with the synchronization information.

I/O controller 1415 may manage input and output signals for device 1405. I/O controller 1415 may also manage peripherals not integrated into device 1405. In some cases, I/O controller 1415 may represent a physical connection or port to an external peripheral. In some cases, I/O controller 1415 may utilize an operating system such as iOS®, ANDROID®, MS-DOS®, MS-WINDOWS®, OS/2®, UNIX®, LINUX®, or another known operating system. In other cases, I/O controller 1415 may represent or interact with a modem, a keyboard, a mouse, a touchscreen, or a similar device. In some cases, I/O controller 1415 may be implemented as part of a processor. In some cases, a user may interact with device 1405 via I/O controller 1415 or via hardware components controlled by I/O controller 1415.

Transceiver 1420 may communicate bi-directionally, via one or more antennas, wired, or wireless links as described herein. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

Memory 1430 may include RAM and ROM. The memory 1430 may store computer-readable, computer-executable software 1435 including instructions that, when executed, cause the processor to perform various functions described herein. In some cases, the memory 1430 may contain, among other things, a BIOS which may control basic hardware or software operation such as the interaction with peripheral components or devices.

Processor 1440 may include an intelligent hardware device, (e.g., a general-purpose processor, a DSP, a CPU, a microcontroller, an ASIC, an FPGA, a PLD, a discrete gate or transistor logic component, a discrete hardware component, or any combination thereof). In some cases, processor 1440 may be configured to operate a memory array using a memory controller. In other cases, a memory controller may be integrated into processor 1440. Processor 1440 may be configured to execute computer-readable instructions stored in a memory to perform various functions (e.g., functions or tasks supporting flexible synchronous and asynchronous access procedure).

Figure 15:
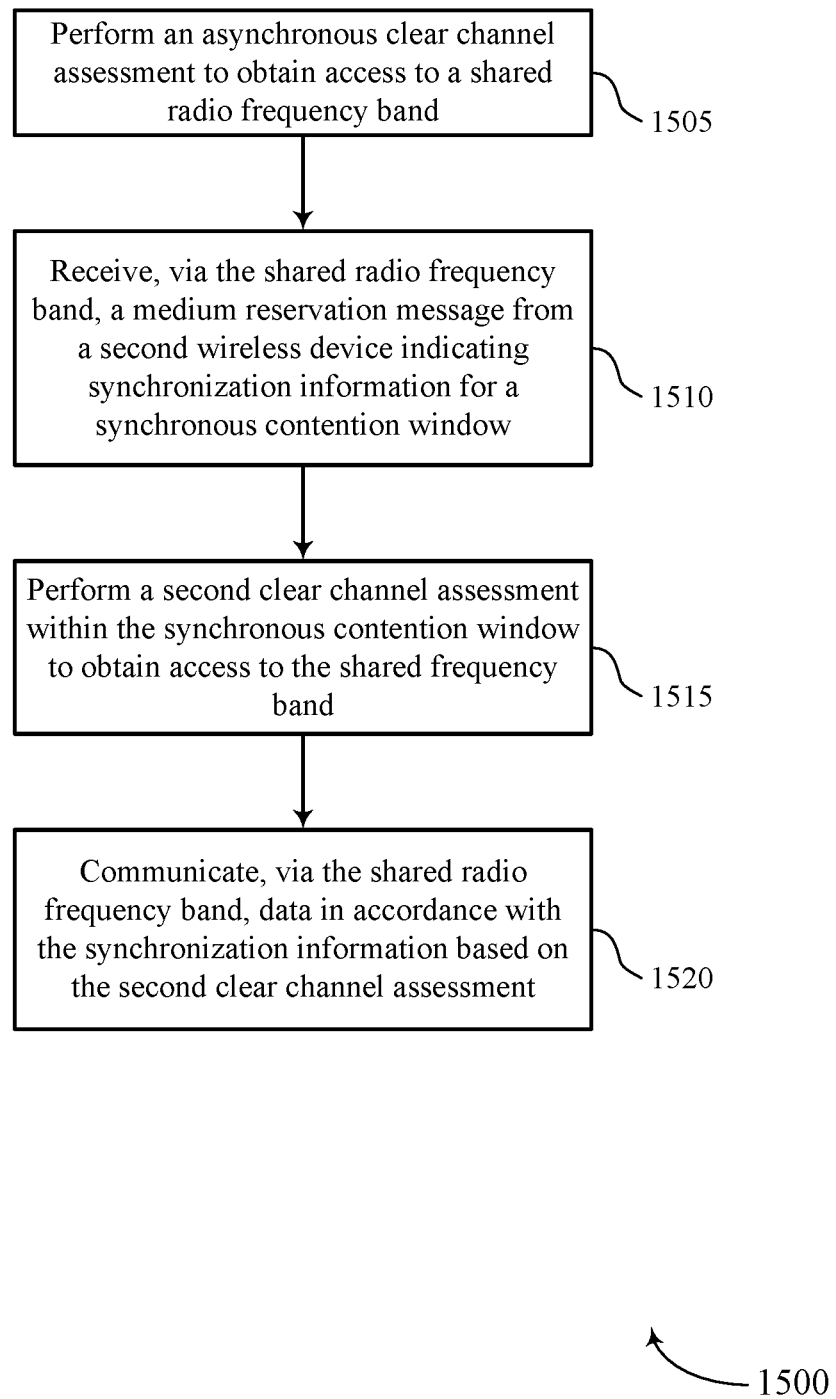
FIGS. 15 through 23 show flowcharts illustrating methods that support flexible synchronous and asynchronous access procedure in accordance with aspects of the present disclosure.

FIG. 15 shows a flowchart illustrating a method 1500 that supports flexible synchronous and asynchronous access procedure in accordance with aspects of the present disclosure. The operations of method 1500 may be implemented by an AP or its components as described herein. In some cases, a STA, UE, or similar device or associated components may similarly perform the operations of method 1500. For example, the operations of method 1500 may be performed by an AP contention manager as described with reference to FIGS. 7 through 10. Additionally or alternatively, a STA contention manager as described herein with reference to FIGS. 11 through 14 may perform the operations of method 1500. In some examples, an AP may execute a set of instructions to control the functional elements of the AP to perform the functions described herein. Additionally or alternatively, an AP may perform aspects of the functions described herein using special-purpose hardware.

At 1505, the AP may perform an asynchronous clear channel assessment to obtain access to a shared radio frequency band. The operations of 1505 may be performed according to the methods described herein. In some examples, aspects of the operations of 1505 may be performed by a contention component as described with reference to FIGS. 7 through 10.

At 1510, the AP may receive, via the shared radio frequency band, a medium reservation message from a second wireless device indicating synchronization information for a synchronous contention window. The operations of 1510 may be performed according to the methods described herein. In some examples, aspects of the operations of 1510 may be performed by a synchronization information receiver as described with reference to FIGS. 7 through 10.

At 1515, the AP may perform a second clear channel assessment within the synchronous contention window to obtain access to the shared radio frequency band. The operations of 1515 may be performed according to the methods described herein. In some examples, aspects of the operations of 1515 may be performed by a synchronous contention component as described with reference to FIGS. 7 through 10.

At 1520, the AP may communicate, via the shared radio frequency band, data in accordance with the synchronization information based on the second clear channel assessment. The operations of 1520 may be performed according to the methods described herein. In some examples, aspects of the operations of 1520 may be performed by a synchronous communicator as described with reference to FIGS. 7 through 10.

Figure 16:
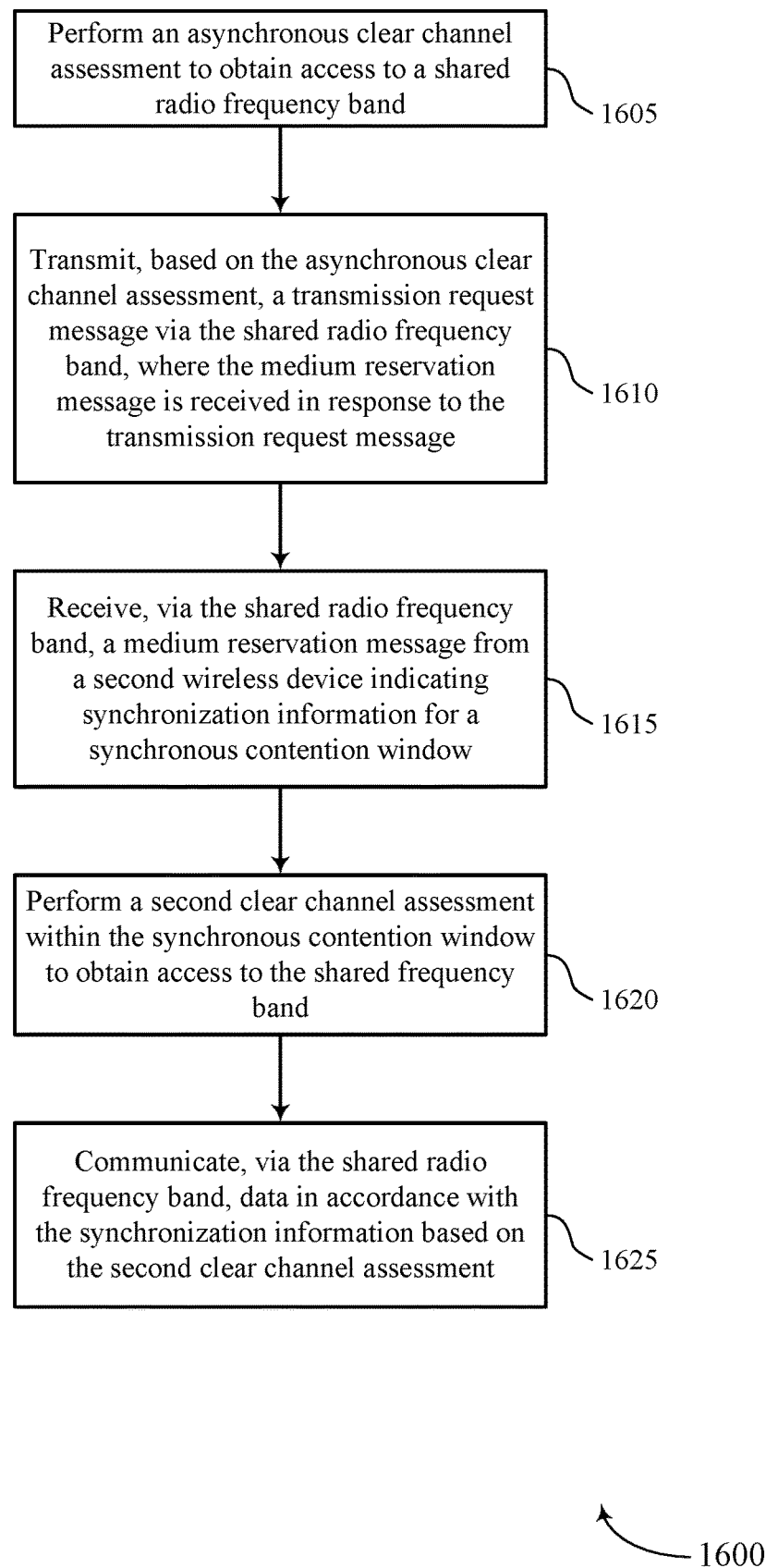

FIG. 16 shows a flowchart illustrating a method 1600 that supports flexible synchronous and asynchronous access procedure in accordance with aspects of the present disclosure. The operations of method 1600 may be implemented by an AP or its components as described herein. In some cases, a STA, UE, or similar device or associated components may similarly perform the operations of method 1600. For example, the operations of method 1600 may be performed by an AP contention manager as described with reference to FIGS. 7 through 10. Additionally or alternatively, a STA contention manager as described herein with reference to FIGS. 11 through 14 may perform the operations of method 1600. In some examples, an AP may execute a set of instructions to control the functional elements of the AP to perform the functions described herein. Additionally or alternatively, an AP may perform aspects of the functions described herein using special-purpose hardware.

At 1605, the AP may perform an asynchronous clear channel assessment to obtain access to a shared radio frequency band. The operations of 1605 may be performed according to the methods described herein. In some examples, aspects of the operations of 1605 may be performed by a contention component as described with reference to FIGS. 7 through 10.

At 1610, the AP may transmit, based on the asynchronous clear channel assessment, a transmission request message via the shared radio frequency band, where the medium reservation message is received in response to the transmission request message. The operations of 1610 may be performed according to the methods described herein. In some examples, aspects of the operations of 1610 may be performed by a transmission request component as described with reference to FIGS. 7 through 10.

At 1615, the AP may receive, via the shared radio frequency band, a medium reservation message from a second wireless device indicating synchronization information for a synchronous contention window. The operations of 1615 may be performed according to the methods described herein. In some examples, aspects of the operations of 1615 may be performed by a synchronization information receiver as described with reference to FIGS. 7 through 10.

At 1620, the AP may perform a second clear channel assessment within the synchronous contention window to obtain access to the shared radio frequency band. The operations of 1620 may be performed according to the methods described herein. In some examples, aspects of the operations of 1620 may be performed by a synchronous contention component as described with reference to FIGS. 7 through 10.

At 1625, the AP may communicate, via the shared radio frequency band, data in accordance with the synchronization information based on the second clear channel assessment. The operations of 1625 may be performed according to the methods described herein. In some examples, aspects of the operations of 1625 may be performed by a synchronous communicator as described with reference to FIGS. 7 through 10.

Figure 17:
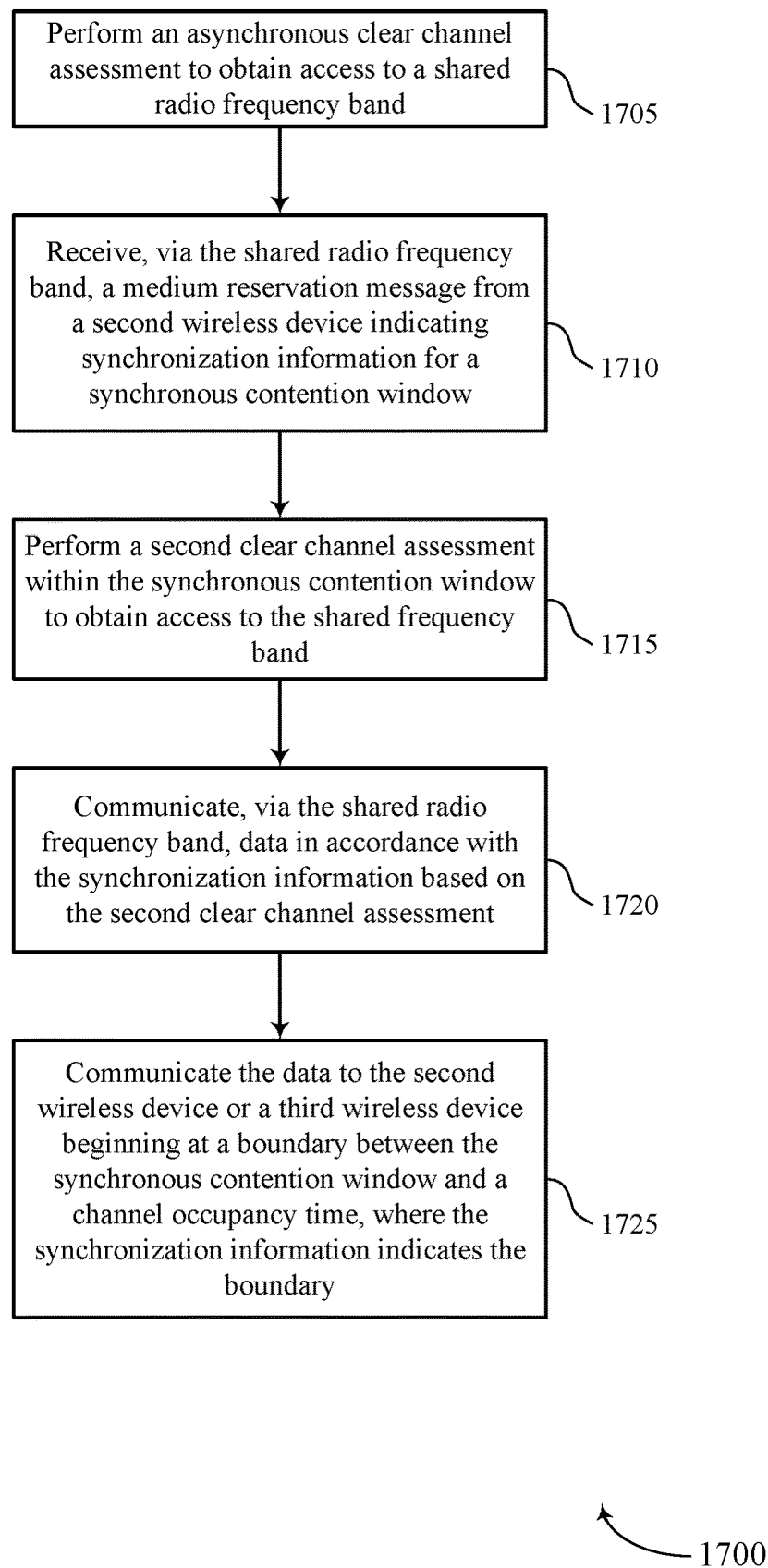

FIG. 17 shows a flowchart illustrating a method 1700 that supports flexible synchronous and asynchronous access procedure in accordance with aspects of the present disclosure. The operations of method 1700 may be implemented by an AP or its components as described herein. In some cases, a STA, UE, or similar device or associated components may similarly perform the operations of method 1700. For example, the operations of method 1700 may be performed by an AP contention manager as described with reference to FIGS. 7 through 10. Additionally or alternatively, a STA contention manager as described herein with reference to FIGS. 11 through 14 may perform the operations of method 1700. In some examples, an AP may execute a set of instructions to control the functional elements of the AP to perform the functions described herein. Additionally or alternatively, an AP may perform aspects of the functions described herein using special-purpose hardware.

At 1705, the AP may perform an asynchronous clear channel assessment to obtain access to a shared radio frequency band. The operations of 1705 may be performed according to the methods described herein. In some examples, aspects of the operations of 1705 may be performed by a contention component as described with reference to FIGS. 7 through 10.

At 1710, the AP may receive, via the shared radio frequency band, a medium reservation message from a second wireless device indicating synchronization information for a synchronous contention window. The operations of 1710 may be performed according to the methods described herein. In some examples, aspects of the operations of 1710 may be performed by a synchronization information receiver as described with reference to FIGS. 7 through 10.

At 1715, the AP may perform a second clear channel assessment within the synchronous contention window to obtain access to the shared radio frequency band. The operations of 1715 may be performed according to the methods described herein. In some examples, aspects of the operations of 1715 may be performed by a synchronous contention component as described with reference to FIGS. 7 through 10.

At 1720, the AP may communicate, via the shared radio frequency band, data in accordance with the synchronization information based on the second clear channel assessment. The operations of 1720 may be performed according to the methods described herein. In some examples, aspects of the operations of 1720 may be performed by a synchronous communicator as described with reference to FIGS. 7 through 10.

At 1725, the AP may communicate the data to the second wireless device or a third wireless device beginning at a boundary between the synchronous contention window and a channel occupancy time, where the synchronization information indicates the boundary. The operations of 1725 may be performed according to the methods described herein. In some examples, aspects of the operations of 1725 may be performed by a synchronous communicator as described with reference to FIGS. 7 through 10.

Figure 18:
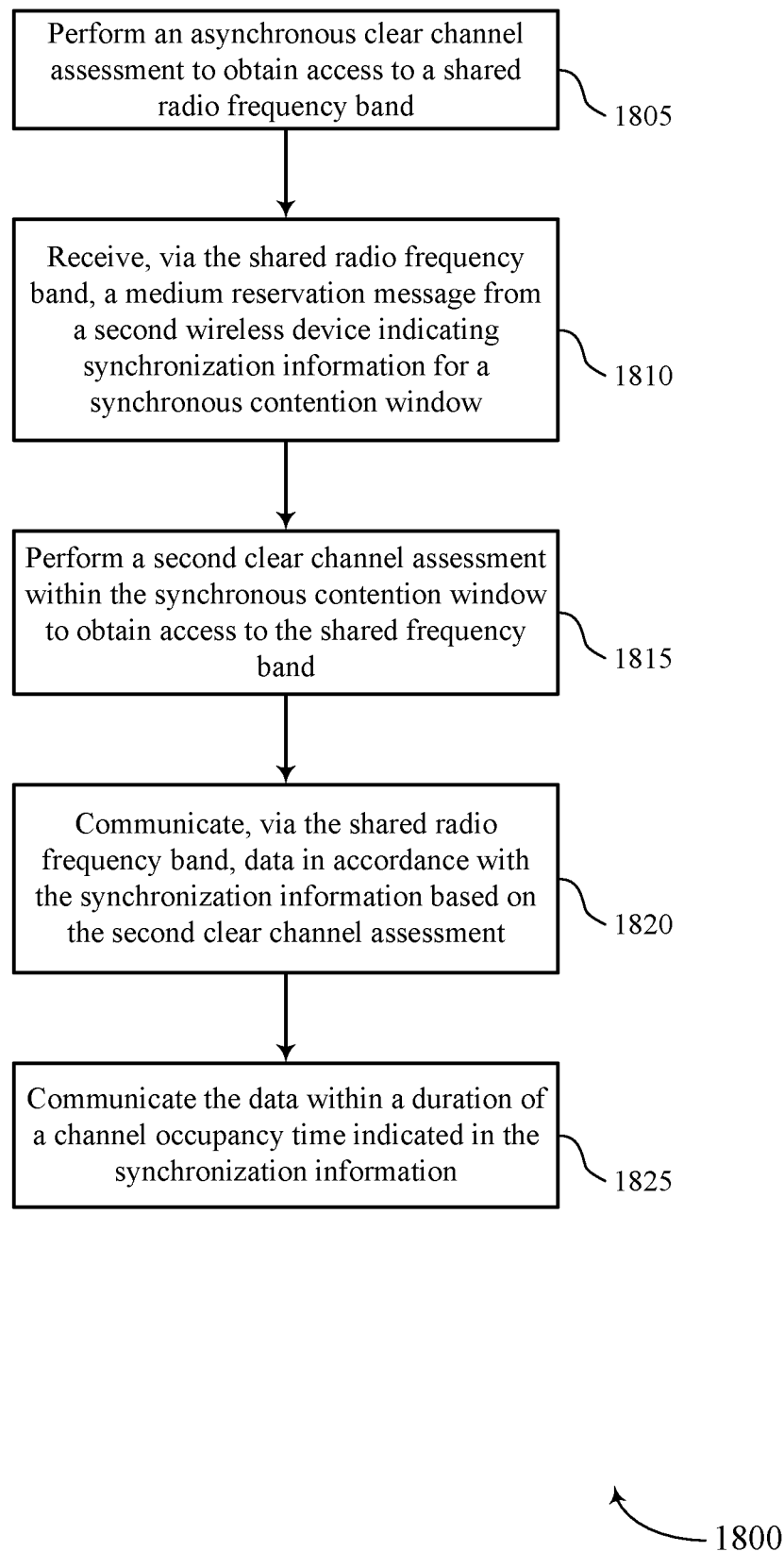

FIG. 18 shows a flowchart illustrating a method 1800 that supports flexible synchronous and asynchronous access procedure in accordance with aspects of the present disclosure. The operations of method 1800 may be implemented by an AP or its components as described herein. In some cases, a STA, UE, or similar device or associated components may similarly perform the operations of method 1800. For example, the operations of method 1800 may be performed by an AP contention manager as described with reference to FIGS. 7 through 10. Additionally or alternatively, a STA contention manager as described herein with reference to FIGS. 11 through 14 may perform the operations of method 1800. In some examples, an AP may execute a set of instructions to control the functional elements of the AP to perform the functions described below. Additionally or alternatively, an AP may perform aspects of the functions described below using special-purpose hardware.

At 1805, the AP may perform an asynchronous clear channel assessment to obtain access to a shared radio frequency band. The operations of 1805 may be performed according to the methods described herein. In some examples, aspects of the operations of 1805 may be performed by a contention component as described with reference to FIGS. 7 through 10.

At 1810, the AP may receive, via the shared radio frequency band, a medium reservation message from a second wireless device indicating synchronization information for a synchronous contention window. The operations of 1810 may be performed according to the methods described herein. In some examples, aspects of the operations of 1810 may be performed by a synchronization information receiver as described with reference to FIGS. 7 through 10.

At 1815, the AP may perform a second clear channel assessment within the synchronous contention window to obtain access to the shared radio frequency band. The operations of 1815 may be performed according to the methods described herein. In some examples, aspects of the operations of 1815 may be performed by a synchronous contention component as described with reference to FIGS. 7 through 10.

At 1820, the AP may communicate, via the shared radio frequency band, data in accordance with the synchronization information based on the second clear channel assessment. The operations of 1820 may be performed according to the methods described herein. In some examples, aspects of the operations of 1820 may be performed by a synchronous communicator as described with reference to FIGS. 7 through 10.

At 1825, the AP may communicate the data within a duration of a channel occupancy time indicated in the synchronization information. The operations of 1825 may be performed according to the methods described herein. In some examples, aspects of the operations of 1825 may be performed by a synchronous communicator as described with reference to FIGS. 7 through 10.

Figure 19:
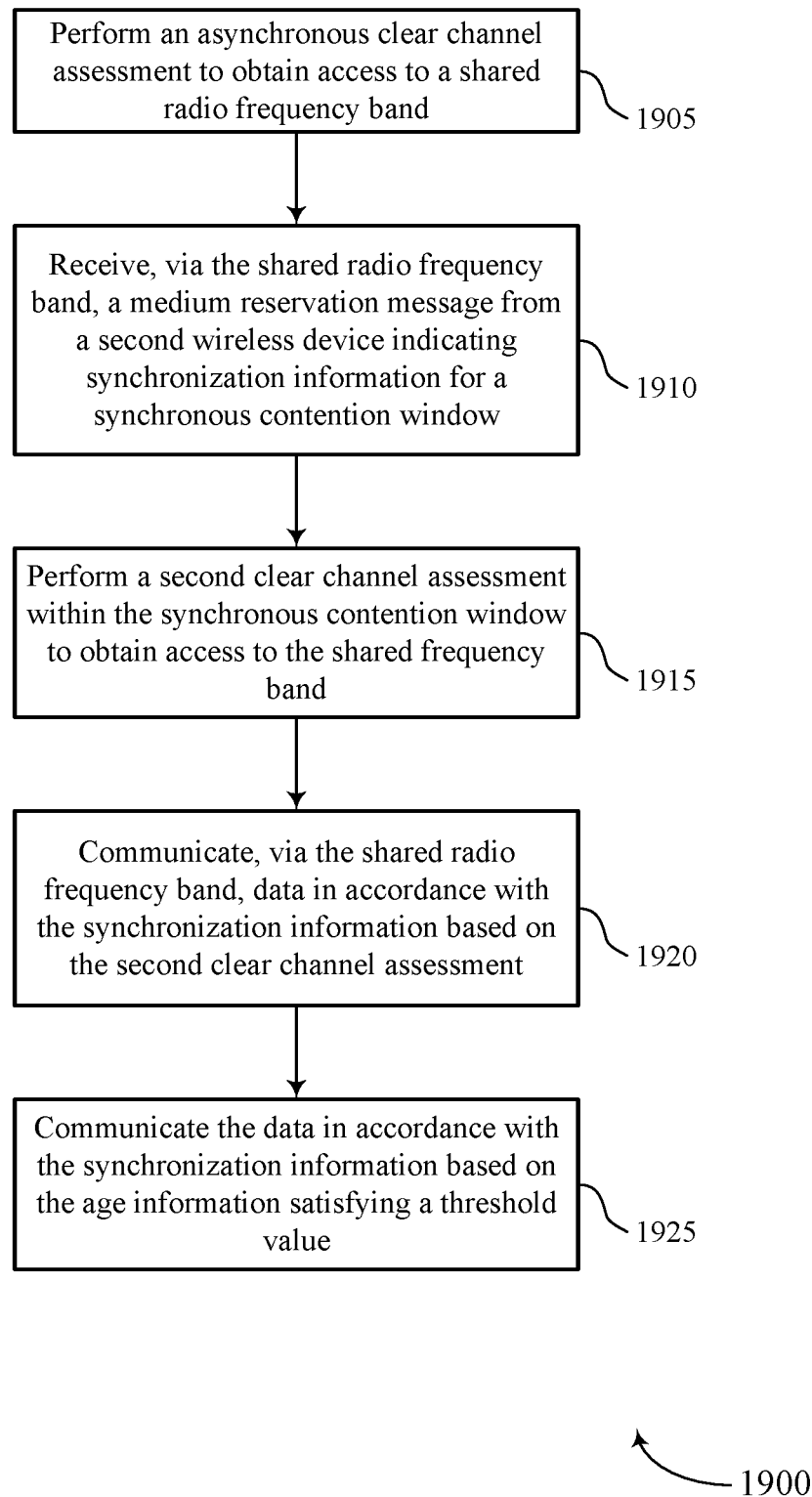

FIG. 19 shows a flowchart illustrating a method 1900 that supports flexible synchronous and asynchronous access procedure in accordance with aspects of the present disclosure. The operations of method 1900 may be implemented by an AP or its components as described herein. In some cases, a STA, UE, or similar device or associated components may similarly perform the operations of method 1900. For example, the operations of method 1900 may be performed by an AP contention manager as described with reference to FIGS. 7 through 10. Additionally or alternatively, a STA contention manager as described herein with reference to FIGS. 11 through 14 may perform the operations of method 1900. In some examples, an AP may execute a set of instructions to control the functional elements of the AP to perform the functions described herein. Additionally or alternatively, an AP may perform aspects of the functions described herein using special-purpose hardware.

At 1905, the AP may perform an asynchronous clear channel assessment to obtain access to a shared radio frequency band. The operations of 1905 may be performed according to the methods described herein. In some examples, aspects of the operations of 1905 may be performed by a contention component as described with reference to FIGS. 7 through 10.

At 1910, the AP may receive, via the shared radio frequency band, a medium reservation message from a second wireless device indicating synchronization information for a synchronous contention window. The operations of 1910 may be performed according to the methods described herein. In some examples, aspects of the operations of 1910 may be performed by a synchronization information receiver as described with reference to FIGS. 7 through 10.

At 1915, the AP may perform a second clear channel assessment within the synchronous contention window to obtain access to the shared radio frequency band. The operations of 1915 may be performed according to the methods described herein. In some examples, aspects of the operations of 1915 may be performed by a synchronous contention component as described with reference to FIGS. 7 through 10.

At 1920, the AP may communicate, via the shared radio frequency band, data in accordance with the synchronization information based on the second clear channel assessment. The operations of 1920 may be performed according to the methods described herein. In some examples, aspects of the operations of 1920 may be performed by a synchronous communicator as described with reference to FIGS. 7 through 10.

At 1925, the AP may communicate the data in accordance with the synchronization information based on the age information satisfying a threshold value. The operations of 1925 may be performed according to the methods described herein. In some examples, aspects of the operations of 1925 may be performed by an age information component as described with reference to FIGS. 7 through 10. Accordingly, the described operations of method 1900 as implemented by the AP or its components may promote flexible synchronous and asynchronous access procedure which may provide improved QoS and synchronization among wireless devices in a wireless system, among other advantages.

Figure 20:
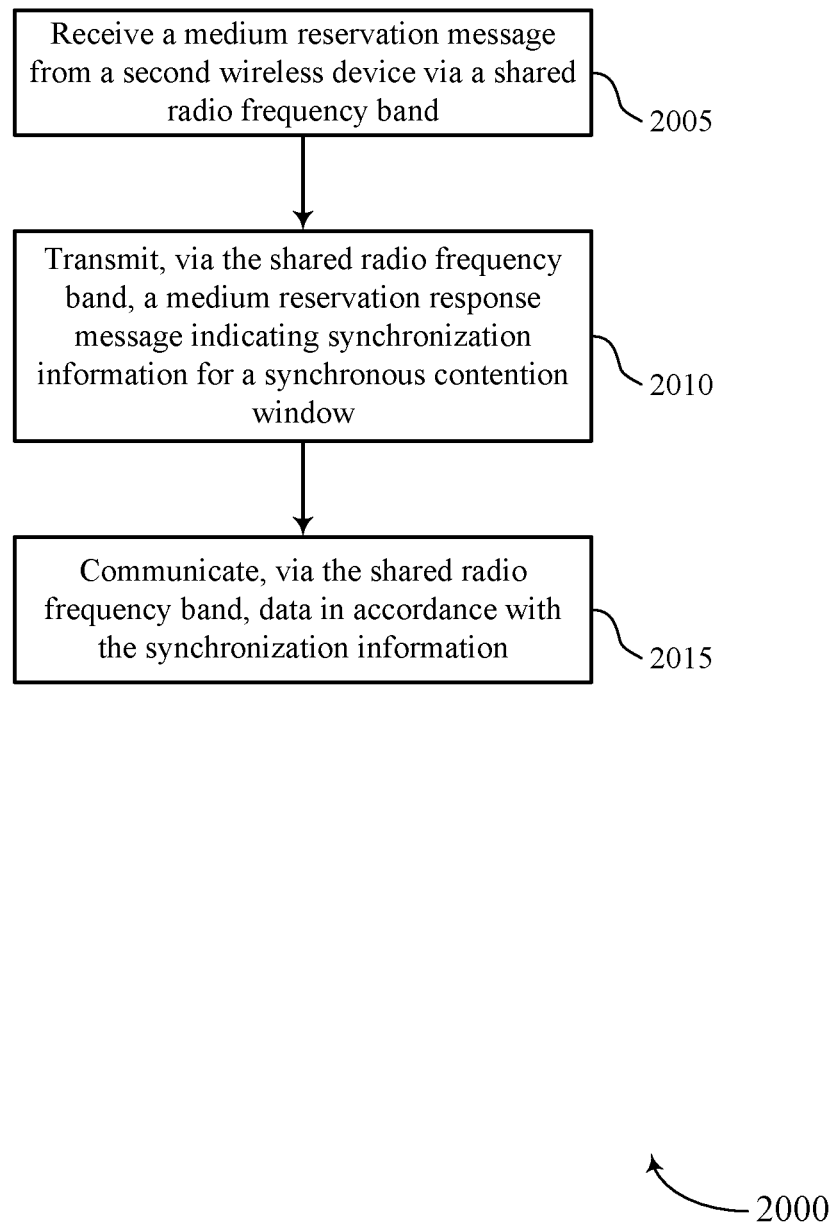

FIG. 20 shows a flowchart illustrating a method 2000 that supports flexible synchronous and asynchronous access procedure in accordance with aspects of the present disclosure. The operations of method 2000 may be implemented by a STA or its components as described herein. In some cases, an AP, base station, or similar device or associated components may similarly perform the operations of method 2000. For example, the operations of method 2000 may be performed by a STA contention manager as described with reference to FIGS. 11 through 14. Additionally or alternatively, an AP contention manager as described herein with reference to 7 through 10 may perform the operations of method 2000. In some examples, a STA may execute a set of instructions to control the functional elements of the STA to perform the functions described herein. Additionally or alternatively, a STA may perform aspects of the functions described herein using special-purpose hardware.

At 2005, the STA may receive a medium reservation message from a second wireless device via a shared radio frequency band. The operations of 2005 may be performed according to the methods described herein. In some examples, aspects of the operations of 2005 may be performed by a medium reservation message receiver as described with reference to FIGS. 11 through 14.

At 2010, the STA may transmit, via the shared radio frequency band, a medium reservation response message indicating synchronization information for a synchronous contention window. The operations of 2010 may be performed according to the methods described herein. In some examples, aspects of the operations of 2010 may be performed by a synchronization component as described with reference to FIGS. 11 through 14.

At 2015, the STA may communicate, via the shared radio frequency band, data in accordance with the synchronization information. The operations of 2015 may be performed according to the methods described herein. In some examples, aspects of the operations of 2015 may be performed by a synchronized communication component as described with reference to FIGS. 11 through 14.

Figure 21:
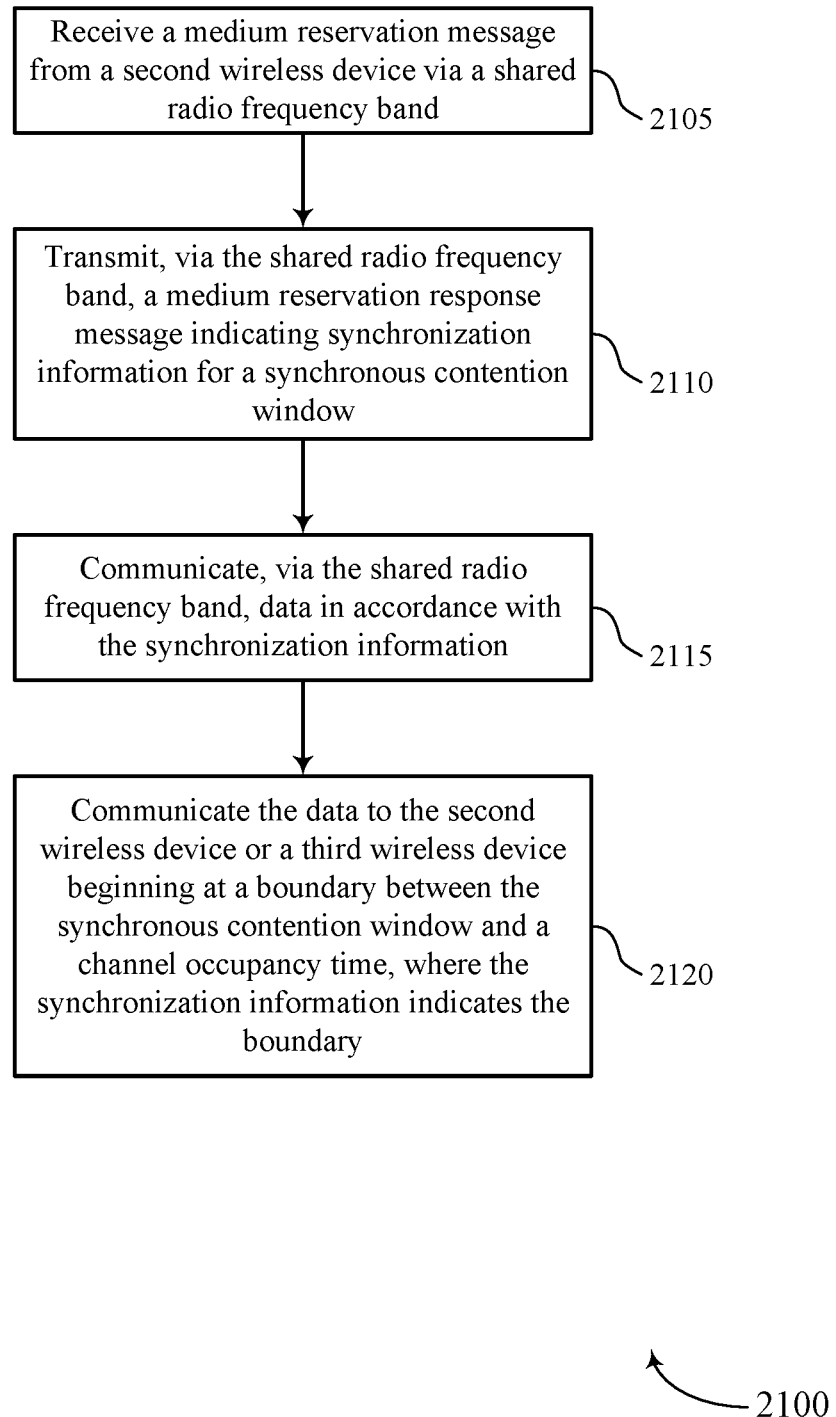

FIG. 21 shows a flowchart illustrating a method 2100 that supports flexible synchronous and asynchronous access procedure in accordance with aspects of the present disclosure. The operations of method 2100 may be implemented by a STA or its components as described herein. In some cases, an AP, base station, or similar device or associated components may similarly perform the operations of method 2100. For example, the operations of method 2100 may be performed by a STA contention manager as described with reference to FIGS. 11 through 14. Additionally or alternatively, an AP contention manager as described herein with reference to 7 through 10 may perform the operations of method 2100. In some examples, a STA may execute a set of instructions to control the functional elements of the STA to perform the functions described herein. Additionally or alternatively, a STA may perform aspects of the functions described herein using special-purpose hardware.

At 2105, the STA may receive a medium reservation message from a second wireless device via a shared radio frequency band. The operations of 2105 may be performed according to the methods described herein. In some examples, aspects of the operations of 2105 may be performed by a medium reservation message receiver as described with reference to FIGS. 11 through 14.

At 2110, the STA may transmit, via the shared radio frequency band, a medium reservation response message indicating synchronization information for a synchronous contention window. The operations of 2110 may be performed according to the methods described herein. In some examples, aspects of the operations of 2110 may be performed by a synchronization component as described with reference to FIGS. 11 through 14.

At 2115, the STA may communicate, via the shared radio frequency band, data in accordance with the synchronization information. The operations of 2115 may be performed according to the methods described herein. In some examples, aspects of the operations of 2115 may be performed by a synchronized communication component as described with reference to FIGS. 11 through 14.

At 2120, the STA may communicate the data to the second wireless device or a third wireless device beginning at a boundary between the synchronous contention window and a channel occupancy time, where the synchronization information indicates the boundary. The operations of 2120 may be performed according to the methods described herein. In some examples, aspects of the operations of 2120 may be performed by a synchronized communication component as described with reference to FIGS. 11 through 14.

Figure 22:
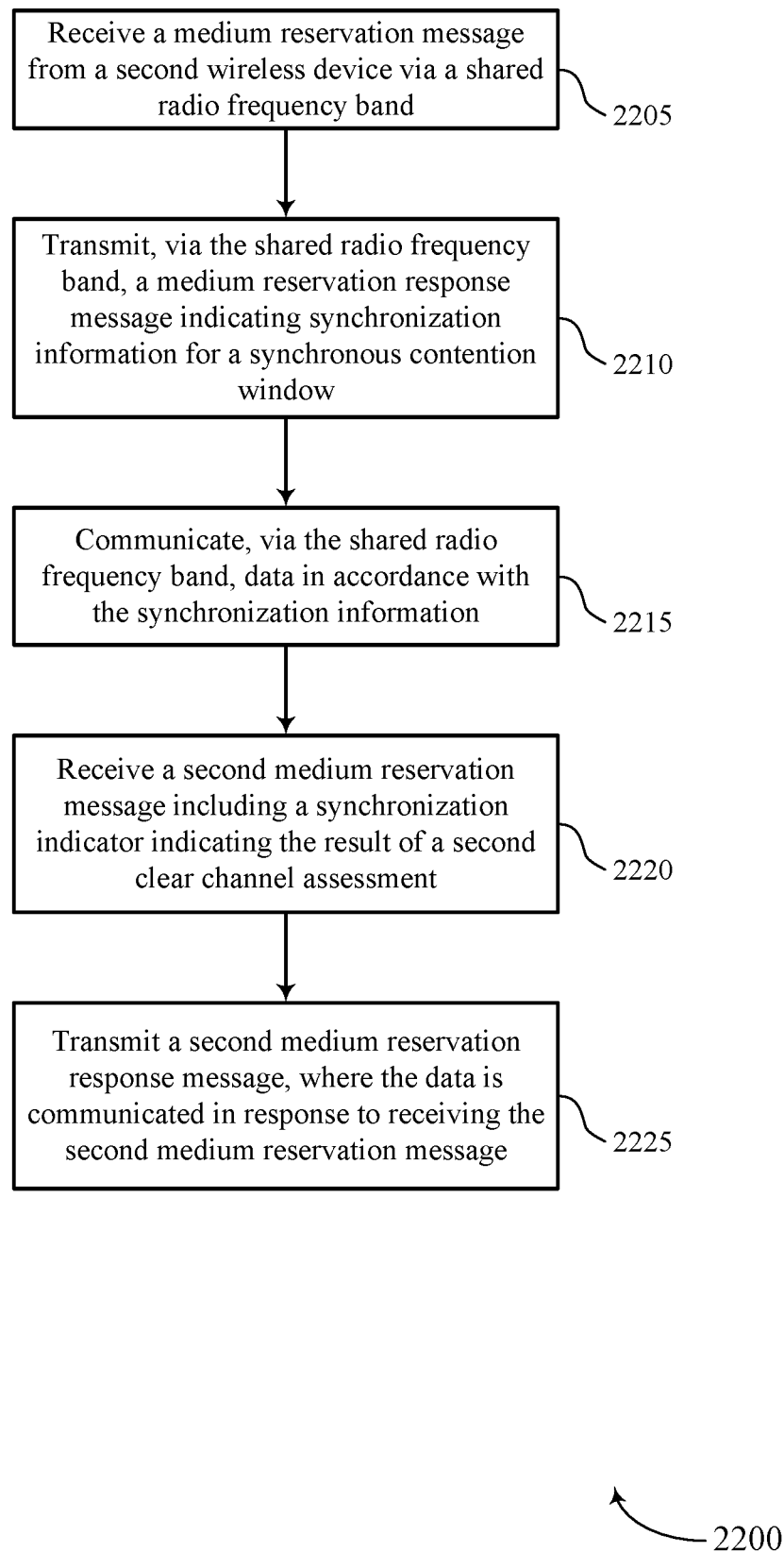

FIG. 22 shows a flowchart illustrating a method 2200 that supports flexible synchronous and asynchronous access procedure in accordance with aspects of the present disclosure. The operations of method 2200 may be implemented by a STA or its components as described herein. In some cases, an AP, base station, or similar device or associated components may similarly perform the operations of method 2200. For example, the operations of method 2200 may be performed by a STA contention manager as described with reference to FIGS. 11 through 14. Additionally or alternatively, an AP contention manager as described herein with reference to 7 through 10 may perform the operations of method 2200. In some examples, a STA may execute a set of instructions to control the functional elements of the STA to perform the functions described herein. Additionally or alternatively, a STA may perform aspects of the functions described herein using special-purpose hardware.

At 2205, the STA may receive a medium reservation message from a second wireless device via a shared radio frequency band. The operations of 2205 may be performed according to the methods described herein. In some examples, aspects of the operations of 2205 may be performed by a medium reservation message receiver as described with reference to FIGS. 11 through 14.

At 2210, the STA may transmit, via the shared radio frequency band, a medium reservation response message indicating synchronization information for a synchronous contention window. The operations of 2210 may be performed according to the methods described herein. In some examples, aspects of the operations of 2210 may be performed by a synchronization component as described with reference to FIGS. 11 through 14.

At 2215, the STA may communicate, via the shared radio frequency band, data in accordance with the synchronization information. The operations of 2215 may be performed according to the methods described herein. In some examples, aspects of the operations of 2215 may be performed by a synchronized communication component as described with reference to FIGS. 11 through 14.

At 2220, the STA may receive a second medium reservation message including a synchronization indicator indicating the result of a second clear channel assessment. The operations of 2220 may be performed according to the methods described herein. In some examples, aspects of the operations of 2220 may be performed by a clear channel assessment component as described with reference to FIGS. 11 through 14.

At 2225, the STA may transmit a second medium reservation response message, where the data is communicated in response to receiving the second medium reservation message. The operations of 2225 may be performed according to the methods described herein. In some examples, aspects of the operations of 2225 may be performed by a clear channel assessment component as described with reference to FIGS. 11 through 14.

Figure 23:
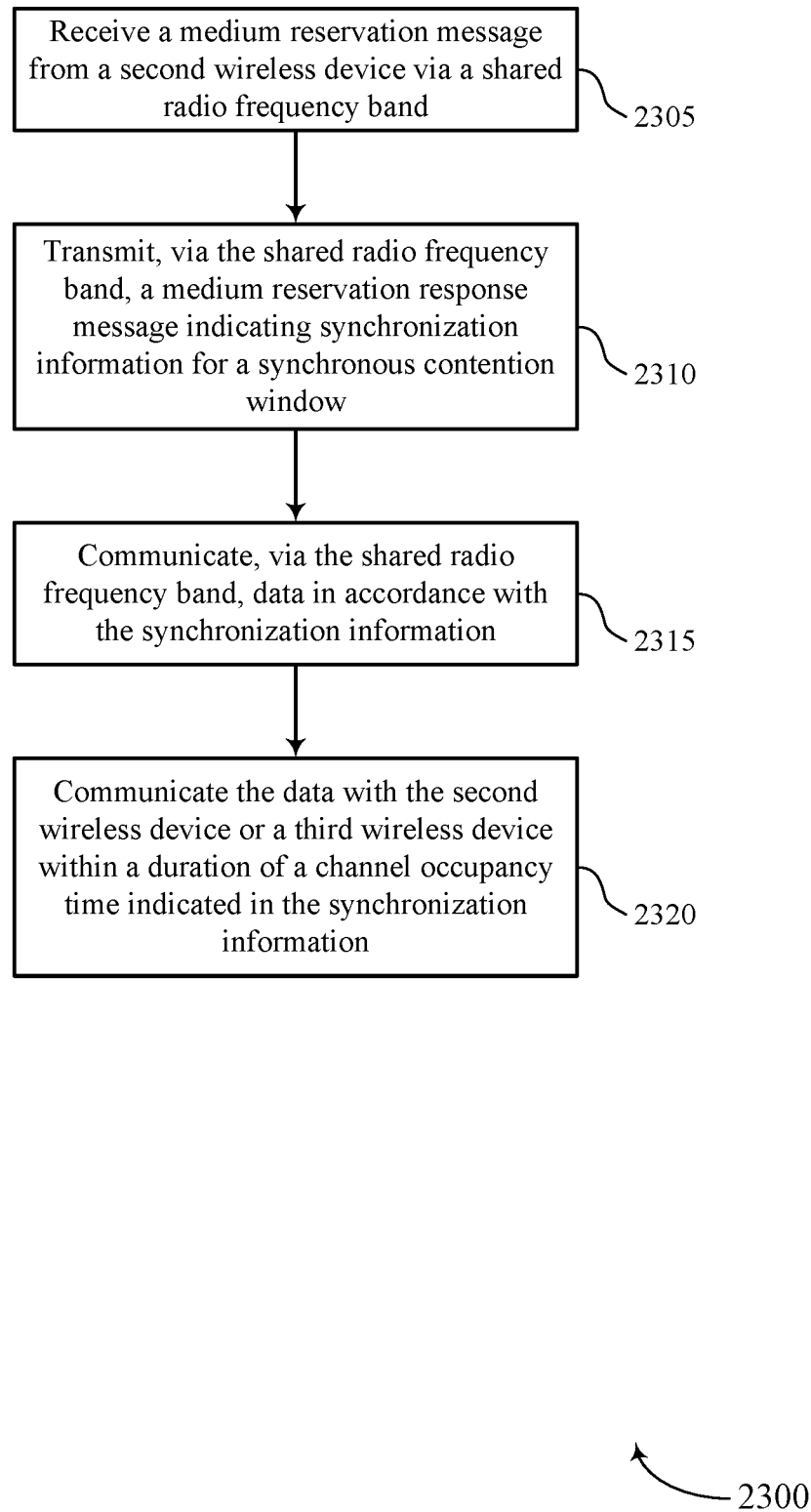

FIG. 23 shows a flowchart illustrating a method 2300 that supports flexible synchronous and asynchronous access procedure in accordance with aspects of the present disclosure. The operations of method 2300 may be implemented by a STA or its components as described herein. In some cases, an AP, base station, or similar device or associated components may similarly perform the operations of method 2300. For example, the operations of method 2300 may be performed by a STA contention manager as described with reference to FIGS. 11 through 14. Additionally or alternatively, an AP contention manager as described herein with reference to 7 through 10 may perform the operations of method 2300. In some examples, a STA may execute a set of instructions to control the functional elements of the STA to perform the functions described herein. Additionally or alternatively, a STA may perform aspects of the functions described herein using special-purpose hardware.

At 2305, the STA may receive a medium reservation message from a second wireless device via a shared radio frequency band. The operations of 2305 may be performed according to the methods described herein. In some examples, aspects of the operations of 2305 may be performed by a medium reservation message receiver as described with reference to FIGS. 11 through 14.

At 2310, the STA may transmit, via the shared radio frequency band, a medium reservation response message indicating synchronization information for a synchronous contention window. The operations of 2310 may be performed according to the methods described herein. In some examples, aspects of the operations of 2310 may be performed by a synchronization component as described with reference to FIGS. 11 through 14.

At 2315, the STA may communicate, via the shared radio frequency band, data in accordance with the synchronization information. The operations of 2315 may be performed according to the methods described herein. In some examples, aspects of the operations of 2315 may be performed by a synchronized communication component as described with reference to FIGS. 11 through 14.

At 2320, the STA may communicate the data with the second wireless device or a third wireless device within a duration of a channel occupancy time indicated in the synchronization information. The operations of 2320 may be performed according to the methods described herein. In some examples, aspects of the operations of 2320 may be performed by a synchronized communication component as described with reference to FIGS. 11 through 14. Accordingly, the described operations of method 2300 as implemented by the STA or its components may promote flexible synchronous and asynchronous access procedure which may provide improved QoS and synchronization among wireless devices in a wireless system, among other advantages.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other PLD, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a first wireless device, comprising:
    performing an asynchronous clear channel assessment to obtain access to a shared radio frequency band;
    receiving, via the shared radio frequency band, a medium reservation message from a second wireless device indicating synchronization information for a synchronous contention window, wherein the synchronization information indicates a duration of a channel occupancy time, a duration of the synchronous contention window, a duration in which the first wireless device is to maintain synchronization, or any combination thereof;
    performing a second clear channel assessment within the synchronous contention window to obtain access to the shared radio frequency band; and
    communicating, via the shared radio frequency band, data in accordance with the synchronization information based at least in part on the second clear channel assessment.

2. The method of claim 1, further comprising:
    transmitting, based at least in part on the asynchronous clear channel assessment, a transmission request message via the shared radio frequency band, wherein the medium reservation message is received in response to the transmission request message.

3. The method of claim 1, wherein the synchronization information configures the first wireless device with the synchronous contention window in which to contend for access to the shared radio frequency band.

4. The method of claim 1, wherein communicating the data in accordance with the synchronization information further comprises:
    communicating the data to the second wireless device or a third wireless device beginning at a boundary between the synchronous contention window and Rail the channel occupancy time, wherein the synchronization information indicates the boundary.

5. The method of claim 4, wherein the synchronization information includes a time shift relative to a synchronized clock time for indicating the boundary.

6. The method of claim 1, further comprising:
    transmitting a second medium reservation message comprising a synchronization indicator indicating a result of the second clear channel assessment, wherein the data is communicated with the second wireless device or a third wireless device based at least in part on the second medium reservation message.

7. The method of claim 1, wherein communicating the data in accordance with the synchronization information further comprises:
    communicating the data within the duration of the channel occupancy time indicated in the synchronization information.

8. The method of claim 1, wherein the synchronization information indicates a first priority level of a plurality of different priority levels assigned to the first wireless device, and wherein performing the second clear channel assessment further comprises:
performing, within a first time duration of a plurality of different time durations of the synchronous contention window corresponding to the first priority level, the second clear channel assessment to contend for access to the shared radio frequency band.

9. The method of claim 8, wherein the first priority level is based at least in part on a quality of service level for the data.

10. The method of claim 1, wherein the synchronization information indicates a first synchronization configuration of a plurality of synchronization configurations.

11. The method of claim 10, wherein each synchronization configuration of the plurality of synchronization configurations has a different duration for the channel occupancy time, a different number of synchronous contention windows, or both.

12. The method of claim 1, wherein the synchronization information configures the first wireless device to transmit the synchronization information one or more times within a defined duration of time.

13. The method of claim 1, wherein the synchronization information configures the first wireless device to maintain synchronization within a defined duration of time.

14. The method of claim 13, further comprising:
operating in an asynchronous mode based at least in part on determining that the synchronization information has not been received within the defined duration of time.

15. The method of claim 1, wherein the synchronization information comprises a bit indicating whether a receipt time of the medium reservation message indicates a boundary between the synchronous contention window and the channel occupancy time.

16. The method of claim 1, wherein the synchronization information comprises a bit indicating that the second wireless device is synchronized within a time window for which the second wireless device is capable of maintaining synchronization within a defined tolerance.

17. The method of claim 1, further comprising:
monitoring for a second medium reservation message during the synchronous contention window indicated in the synchronization information.

18. The method of claim 1, wherein the medium reservation message comprises age information for the synchronization information, and wherein communicating the data in accordance with the synchronization information further comprises:
communicating the data in accordance with the synchronization information based at least in part on the age information satisfying a threshold value.

19. The method of claim 1, wherein the medium reservation message comprises age information for the synchronization information, the method further comprising:
adding a time offset to the age information to generate updated age information based at least in part on determining that the first wireless device is not capable of maintaining synchronization for a defined duration of time; and
transmitting the synchronization information and the updated age information to a third wireless device.

20. A method for wireless communication at a first wireless device, comprising:
receiving a medium reservation message from a second wireless device via a shared radio frequency band;
transmitting, via the shared radio frequency band, a medium reservation response message indicating synchronization information for a synchronous contention window, wherein the synchronization information indicates a duration of a channel occupancy time, a duration of the synchronous contention window, a duration in which the first wireless device is to maintain synchronization, or any combination thereof; and
communicating, via the shared radio frequency band, data in accordance with the synchronization information.

21. The method of claim 20, wherein the synchronization information configures the second wireless device with the synchronous contention window in which to contend for access to the shared radio frequency band.

22. The method of claim 20, wherein communicating data further comprises:
communicating the data to the second wireless device or a third wireless device beginning at a boundary between the synchronous contention window and the channel occupancy time, wherein the synchronization information indicates the boundary.

23. The method of claim 22, wherein the synchronization information includes a time shift relative to a synchronized clock time for indicating the boundary.

24. The method of claim 20, further comprising:
receiving a second medium reservation message comprising a synchronization indicator indicating a result of a second clear channel assessment; and
transmitting a second medium reservation response message, wherein the data is communicated in response to receiving the second medium reservation message.

25. The method of claim 20, wherein communicating data further comprises:
communicating the data with the second wireless device or a third wireless device within the duration of the channel occupancy time indicated in the synchronization information.

26. The method of claim 20, wherein the synchronization information indicates a first priority level of a plurality of different priority levels assigned to the first wireless device and a first time duration of a plurality of different time durations of the synchronous contention window corresponding to the first priority level.

27. An apparatus for wireless communication at a first wireless device, comprising: a processor, memory in electronic communication with the processor; and instructions stored in the memory and executable by the processor to cause the apparatus to:
perform an asynchronous clear channel assessment to obtain access to a shared radio frequency band;
receive, via the shared radio frequency band, a medium reservation message from a second wireless device indicating synchronization information for a synchronous contention window, wherein the synchronization information indicates a duration of a channel occupancy time, a duration of the synchronous contention window, a duration in which the first wireless device is to maintain synchronization, or any combination thereof;
perform a second clear channel assessment within the synchronous contention window to obtain access to the shared radio frequency band; and
communicate, via the shared radio frequency band, data in accordance with the synchronization information based at least in part on the second clear channel assessment.

28. An apparatus for wireless communication at a first wireless device, comprising: a processor, memory in electronic communication with the processor; and instructions stored in the memory and executable by the processor to cause the apparatus to:
- receive a medium reservation message from a second wireless device via a shared radio frequency band;
- transmit, via the shared radio frequency band, a medium reservation response message indicating synchronization information for a synchronous contention window, wherein the synchronization information indicates a duration of a channel occupancy time, a duration of the synchronous contention window, a duration in which the first wireless device is to maintain synchronization, or any combination thereof; and
- communicate, via the shared radio frequency band, data in accordance with the synchronization information.

29. The apparatus of claim 27, wherein the instructions executable to communicate the data in accordance with the synchronization information comprises further instructions executable by the processor to cause the apparatus to:
- communicate the data to the second wireless device or a third wireless device beginning at a boundary between the synchronous contention window and the channel occupancy time, wherein the synchronization information indicates the boundary.

30. The apparatus of claim 27, wherein the instructions executable to communicate the data comprises further instructions executable by the processor to cause the apparatus to:
- communicate the data to the second wireless device or a third wireless device beginning at a boundary between the synchronous contention window and the channel occupancy time, wherein the synchronization information indicates the boundary.

* * * * *